(12) United States Patent
Lodolo

(10) Patent No.: US 7,527,241 B2
(45) Date of Patent: May 5, 2009

(54) DIAPHARGM VALVE AND OPEN CLOSE ELEMENT FOR SAID VALVE

(75) Inventor: Alberto Lodolo, Genoa (IT)

(73) Assignee: Tecnidro, Genoa (IT)

( * ) Notice: Subject to any disclaimer, the term of this patent is extended or adjusted under 35 U.S.C. 154(b) by 11 days.

(21) Appl. No.: 10/519,013

(22) PCT Filed: Jun. 24, 2003

(86) PCT No.: PCT/EP03/50252

§ 371 (c)(1), (2), (4) Date: Dec. 21, 2004

(87) PCT Pub. No.: WO2004/005778

PCT Pub. Date: Jan. 15, 2004

(65) Prior Publication Data

US 2006/0118751 A1 Jun. 8, 2006

(30) Foreign Application Priority Data

Jul. 9, 2002 (IT) .......................... SV2002A0032

(51) Int. Cl.
*F16K 7/12* (2006.01)
(52) U.S. Cl. ...................... 251/331; 251/61.4; 137/540; 137/859
(58) Field of Classification Search ................. 251/331, 251/61.2, 61.3, 61.4; 137/540, 843, 852, 137/859; 92/96, 99, 98 R
See application file for complete search history.

(56) References Cited

U.S. PATENT DOCUMENTS

| 1,867,478 | A | * | 7/1932 | Stelzner ................. 137/512.15 |
| 2,309,479 | A | | 1/1943 | Saunders |
| 2,580,133 | A | * | 12/1951 | Sheen ......................... 128/837 |
| 2,616,164 | A | | 11/1952 | Tiedemann |
| 2,725,211 | A | * | 11/1955 | Boteler ........................ 251/77 |
| 2,880,961 | A | * | 4/1959 | Wynn .......................... 251/331 |
| 2,936,998 | A | * | 5/1960 | Loepsinger .................. 251/331 |
| 2,947,325 | A | | 8/1960 | McFarland |
| 3,011,758 | A | * | 12/1961 | McFarland, Jr. ............. 251/331 |
| 3,103,342 | A | * | 9/1963 | Boteler ........................ 251/331 |
| 3,130,954 | A | | 4/1964 | McFarland |
| 3,148,861 | A | | 9/1964 | McFarland |
| 3,154,286 | A | | 10/1964 | McFarland |
| 3,206,530 | A | * | 9/1965 | Boteler ........................ 264/259 |
| 3,250,511 | A | | 5/1966 | Priese |
| 3,310,280 | A | * | 3/1967 | Boteler ........................ 251/331 |

(Continued)

FOREIGN PATENT DOCUMENTS

EP 0853205 7/1998

(Continued)

*Primary Examiner*—J. Casimer Jacyna
(74) *Attorney, Agent, or Firm*—Themis Law

(57) ABSTRACT

A diaphragm valve having an inlet sleeve and an outlet sleeve that converge to a fluid flow chamber contains a valve seat engaged by an elastic diaphragm that is composed of a peripheral flange connected to a central dome-shaped part. The cross section of the two sleeves near the valve seat is flattened in the direction of flow and elongated in the direction transverse thereto, so to form a substantially elliptical port, corresponding to the dome of the diaphragm, which has the shape of a sector of an ellipsoid.

30 Claims, 17 Drawing Sheets

U.S. PATENT DOCUMENTS

| | | | |
|---|---|---|---|
| 3,349,795 A * | 10/1967 | Matsutani | 137/375 |
| 3,451,423 A | 6/1969 | Priese | |
| 3,628,770 A | 12/1971 | Rost | |
| 3,631,882 A * | 1/1972 | White, Jr. | 137/312 |
| 4,014,514 A | 3/1977 | Priese | |
| 4,214,604 A * | 7/1980 | Rumsey | 137/375 |
| 4,319,737 A | 3/1982 | Waterfield | |
| 4,538,638 A * | 9/1985 | Stack | 137/375 |
| 5,065,980 A * | 11/1991 | Pedersen | 251/144 |
| 5,383,646 A * | 1/1995 | Weingarten | 251/61.1 |
| 5,632,465 A | 5/1997 | Cordua | |
| 6,095,484 A * | 8/2000 | Frenkel | 251/61.1 |
| 6,102,071 A * | 8/2000 | Walton et al. | 137/540 |
| 6,189,861 B1 * | 2/2001 | Gotch et al. | 251/331 |

FOREIGN PATENT DOCUMENTS

| | | |
|---|---|---|
| FR | 2815108 | 9/2006 |
| GB | 321892 | 11/1929 |
| GB | 533116 | 2/1941 |
| GB | 806745 | 12/1958 |

* cited by examiner

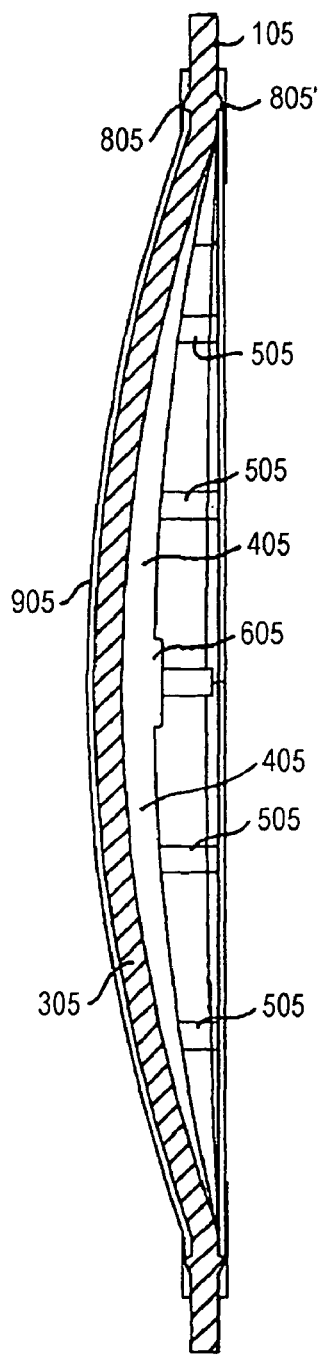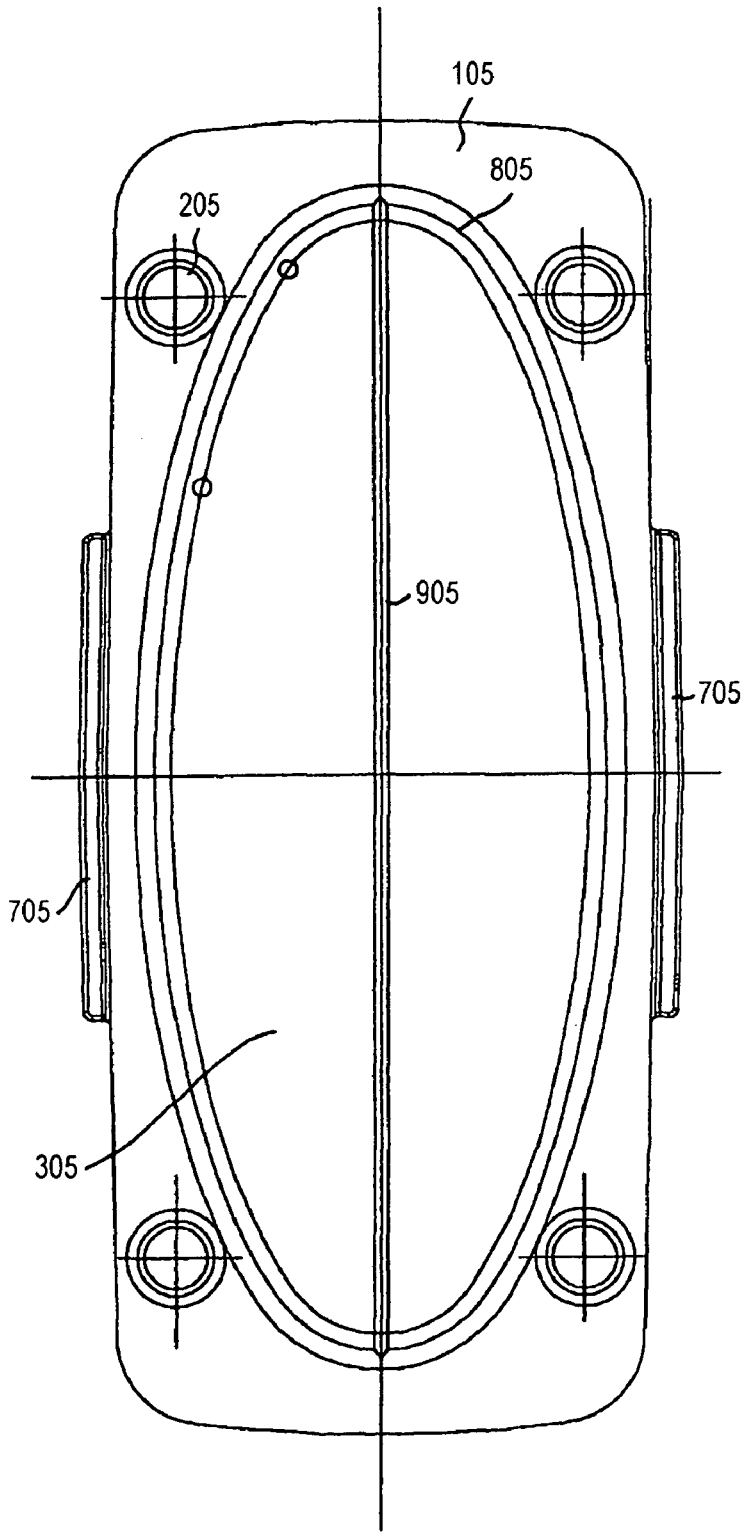
FIG. 8                    FIG. 9

DIAPHARGM VALVE AND OPEN CLOSE ELEMENT FOR SAID VALVE

STATEMENT REGARDING FEDERALLY SPONSORED RESEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

This invention concerns a diaphragm valve, and, more particularly, a diaphragm valve having an inlet sleeve and an outlet sleeve of elongated cross-sections that converge into a valve seat of elongated shape controlled by a diaphragm of elongated shape.

2. Description of Related Art

In prior art diaphragm valves, the inlet and outlet sections of the valve body converge into a substantially circular shape or any such shape that is inscribable in a square, such shape being generated by the confluence of two circular and substantially constant sleeves.

U.S. Pat. No. 4,319,737 to Waterfield discloses a valve having inlet and outlet sections of elliptical shapes that combine into a circular shape, and further having an opening in the body closed with a flange of square-inscribable shape. In general, the diaphragms of the valves in the prior art are circular and have square flanges. This causes such valves to have large sizes and considerable space requirements, particularly in the axial direction of flow. The manufacture of these valves also requires the use of a considerable amount of metal, resulting in very heavy weight and considerable costs, particularly as flow rates and inlet and outlet sleeve diameters, i.e. overall valve sizes, increase. Furthermore, particularly in hydraulically operated valves, the pressure exerted by the fluid that is piped in the pressure chamber defined by the bonnet part and the valve closing dome of the diaphragm may cause the diaphragm to bow out, particularly into the outlet sleeve port, because no counterbalancing pressure is provided, causing the so-called balloon effect. This drawback is also dependent on the considerable length of the radius of the circular diaphragm, when seen in the axial direction of the flow, and more particularly on the long axial diameter of the outlet sleeve port opening into the flow chamber, and is particularly serious in large-size valves, operating at very high flow rates and having large diaphragm surfaces. This drawback may cause the unsupported diaphragm to be damaged, thereby leading to leaks and/or opening/closing problems, because the diaphragm is only partly resilient or is not resilient at all.

In order to obviate this drawback, a rib may be provided in an intermediate position of the outlet sleeve port opening into the flow chamber, which rib is oriented in the flow direction and is substantially perpendicular to the plane tangent to the lower apex of the valve seat. This rib has, at its edge facing toward the dome of the diaphragm, a flattened surface and is appropriately curved to prevent the dome from bowing out when the latter is compressed against the valve seat. Nevertheless, this rib causes an increase of the construction complexity of the valve, as well as in the weight and cost of the valve, and does not solve the problem of the large size, in the flow direction, of prior art valves. Further, from the functional point of view, this rib leads to a possible build up of filamentary matters.

BRIEF SUMMARY OF THE INVENTION

It is an object of the present invention to correct the above drawbacks, thereby providing, by using simple and inexpensive means, a valve as described hereinbefore, but with a diaphragm is not subjected to any abnormal deformation and consequent early wear and/or malfunctioning during use.

It is a further object of the present invention to provide a diaphragm valve having an axial size, a weight and fabrication costs that are lower than in prior art valves.

The present invention achieves the above objects by providing a valve having a valve seat, flattened in the direction of flow, i.e. along the axis that joins the centers of the two inlet and outlet ends of the sleeves Such inlet and outlet sleeves with flattened cross sections open into the flow chamber, and are elongated in a direction transverse to the direction of flow, preferably having a substantially elliptic shape, or anyway a shape inscribable in a substantially rectangular peripheral clamping flange, with the longer side disposed in a direction transverse to the direction of flow. Hence, the peripheral flange of the diaphragm may have a corresponding rectangular shape, inscribing the central convex portion of the diaphragm, which comprises an element having the shape of a sector of an ellipsoid or a similar shape, wherein the section plane is disposed in such a manner as to cooperate with the flow chamber port.

It shall be noted that the inventive concept defined as "flattened in the direction of flow" includes all diaphragm valves and all diaphragm-like open/close elements in which the length in the direction of flow, of the flow chamber, or of the flow chamber closing and diaphragm clamping flange, is shorter than the length in the direction transverse to the flow direction.

According to an embodiment of the invention, which will be described in greater detail below, from the respective free ends to the ends that open into the flow chamber, the two sleeves may have a cross section that progressively widens in a direction transverse and perpendicular to the flow direction and parallel to the separation plane between the two chamber parts, and progressively narrows in a direction substantially coincident with the bending radius of each sleeve so that the flow chamber port, at the flange of the chamber part integrated in the valve body, has a shape that is flattened in the flow direction and elongated in a direction transverse to said flow direction, and preferably has a substantially elliptic shape, or anyway inscribable in a peripheral, substantially rectangular clamping flange, with the longer side disposed transverse to the flow direction. The peripheral flange of the diaphragm may have a corresponding rectangular shape. The severe reduction of the axial size of the flow chamber port, which is obtained by using an elliptic shape, reduces the size and space requirements of the valve in the axial direction, which are generally more problematic than in the transverse direction. Furthermore, the use of a diaphragm having a dome with the shape of a sector of an ellipsoid prevents the latter from bowing out into the outlet sleeve port, thanks to the reduced extension of the arc of said sector of ellipsoid, which corresponds to the shorter diameter along the section plane thereof and thanks to the reduced axial size of said outlet sleeve port, which is "narrower". The flow rate is maintained by correspondingly increasing the transverse size of the flow chamber port. By reducing the radius of the dome-shaped portion of the diaphragm in the direction of flow, the resiliency of the diaphragm is considerably enhanced, which in the idle, unstressed condition, i.e. when its convexity is oriented toward the valve seat. As is known, in the opened condition, the dome shape may be completely inverted, i.e. either more flattened or slightly bowed out toward the bonnet.

In a variation of this embodiment, the dome-shaped part of the diaphragm may have one or more stiffening ribs, to enhance the resiliency of the dome. These ribs may also have the function of preventing the dome from bowing out, when it is compressed against the valve seat. More particularly, stiffening and/or elastic or spring-like ribs may be provided on the concave side facing the bonnet of the diaphragm dome. An advantageous arrangement of the inventive ribs provides that a plurality of ribs are oriented in the flow direction or in the direction of the shorter axis of the diaphragm dome, a median rib being possibly provided in the direction transverse to the flow or along the longer axis of the diaphragm. The ribs improve resiliency over the whole geometry of the dome, but the shorter ribs, oriented in the flow direction, also contributes, in combination with a smaller extension of the port in the direction of the shorter axis, to further prevent the dome from bowing out into the outlet sleeve port.

Also, two more ribs may be provided on the concave side of the diaphragm dome, which faces toward the bonnet, to connect the center of the dome with the substantially median area of each of the four sections into which the dome is divided by the axis of the longer diameter and the axis or shorter diameter of the section plane of the sector of ellipsoid which forms the dome.

By a combination of the above arrangements, the additional advantage is obtained of avoiding the presence, as often provided in prior art valves, of an elastic dome preloading element, like a spring or the like, whose function is to enhance the resiliency of the dome as it turns from the condition in which it is deformed toward the bonnet to the idle unstressed condition, i.e. with its convexity oriented toward the valve seat. This element is generally provided between the bonnet and the concave surface of the diaphragm dome. An additional considerable advantage consists in that no intermediate axial wall is to be provided, prior to the outlet sleeve port, for supporting the diaphragm dome in such a manner as to prevent it from bowing out, as mentioned above. This simplifies construction and provides savings on fabrication costs.

A rigid pressure element, or central stiffening member, preferably having a circular shape, may be provided on the concave side of the diaphragm dome that faces toward the bonnet. This member may also protect the central portion of the dome, if a preloading member, such as a spring or the like, is eventually needed to exert a pressing action on the central area of the concave portion of the diaphragm. This need may arise in particularly heavy operating conditions of the valve.

According to one embodiment, which has a very simple construction, both the ribs and the central stiffening member may consist of locally thickened portions of the diaphragm dome wall.

The diaphragm dome may have a constant thickness, whereas at least some of the stiffening ribs, preferably all of them, have a thickness that increases toward the center of the dome so that the latter has an increasing resistance to deformation towards the center, i.e. in the valve seat compressing area.

Retaining means may be further provided for holding the periphery of the diaphragm flange in such a manner as to prevent it from sliding along the plane of the clamping flanges of the bonnet and of the valve body, and from being extracted from between said clamping flanges. These retaining means may consist of one or more retaining teeth arranged along the peripheral edge of the diaphragm flange, which extend over the surface of the outer edge of the flanges of the valve body and/or the bonnet with a vertical orientation with respect to the plane of the flanges.

In accordance with embodiment, these retaining means may consist of two retaining tabs, each being provided along one of the longer sides of the diaphragm flange edge, particularly in the intermediate area between two through holes into which pins are inserted to hold the flange of the bonnet against the flange of the valve body. Each of these holes may be provided in one of the four corners of the diaphragm flange. Such retaining tabs extend over the corresponding surface of the outer edge of the valve body flange with a vertical orientation with respect to the plane of said flange and retain the diaphragm on the longer side thereof, from where it may more easily slide out, due to the long distance between the two pins in the direction transverse to the flow.

These diaphragm retaining means may further comprise one or more bosses provided on the clamping surface of the bonnet and/or the valve body which, with the two flanges in the coupled condition, compress the corresponding portion of the diaphragm flange thereby further preventing it from sliding out.

In one embodiment of the invention, these retaining means may include a continuous projection, preferably having discontinuities in the areas adjacent to the pins, and having a substantially elliptic profile on the clamping surface of the bonnet flange which, when said flange is pressed against the valve body flange, extends along the substantially elliptic peripheral edge of the diaphragm dome and at a certain distance therefrom.

Means may be also provided for centering the bonnet with respect to the valve body and for laterally limiting any outward extension of the diaphragm flange, particularly while the dome portion changes from the condition in which its concavity is oriented toward the valve seat to the opposite condition, and vice versa.

These means for centering may comprise one or more retaining teeth arranged along the outer peripheral edge of the bonnet flange, which extend over the surface of the outer edge of the valve body flange with a vertical orientation with respect to the plane of the flanges.

Nevertheless, according to one embodiment of the invention, these means may consist of a tab that continuously extends along the whole peripheral edge of the bonnet flange, which tab extends over the corresponding surface of the outer edge of the valve body flange, with a vertical orientation with respect to the plane of said flange.

The diaphragm flange may have, on at least one face, preferably on both faces, at least a continuous lip seal, preferably having a substantially elliptic shape, which extends along the peripheral edge of the diaphragm dome and at a certain distance therefrom and is compressed between the clamping flanges of the bonnet and the valve body, so as to enhance the peripheral sealing features of the diaphragm and to compensate for any variations in flange.

A central rounded lip seal may be provided on the convex side of the diaphragm dome, facing toward the valve seat, when the dome is in the unstressed condition, which is disposed along the longer axis of the section plane of the sector of ellipsoid that forms the dome. When the dome is compressed against said surface of the valve seat, said lip acts as a compliant member helping the dome in adhering against said valve seat and preventing any fluid flow from the inlet sleeve to the outlet sleeve.

The invention further relates to a diaphragm valve as described hereinbefore whose shape is particularly suitable to allow the use of a plastic material in the manufacture of at least the valve body.

Further characteristics and improvements will be detailed below.

BRIEF DESCRIPTION OF THE SEVERAL VIEWS OF THE DRAWINGS

The characteristics of the invention and the advantages derived therefrom will be more apparent from the following detailed description of the annexed drawings, in which:

FIG. 8 is a sectional view, as taken along the longer axis of the diaphragm of FIG. 6.

FIG. 9 is a bottom plan view of the diaphragm of the valve as shown in FIG. 1.

DETAILED DESCRIPTION OF THE INVENTION

Figure 1:
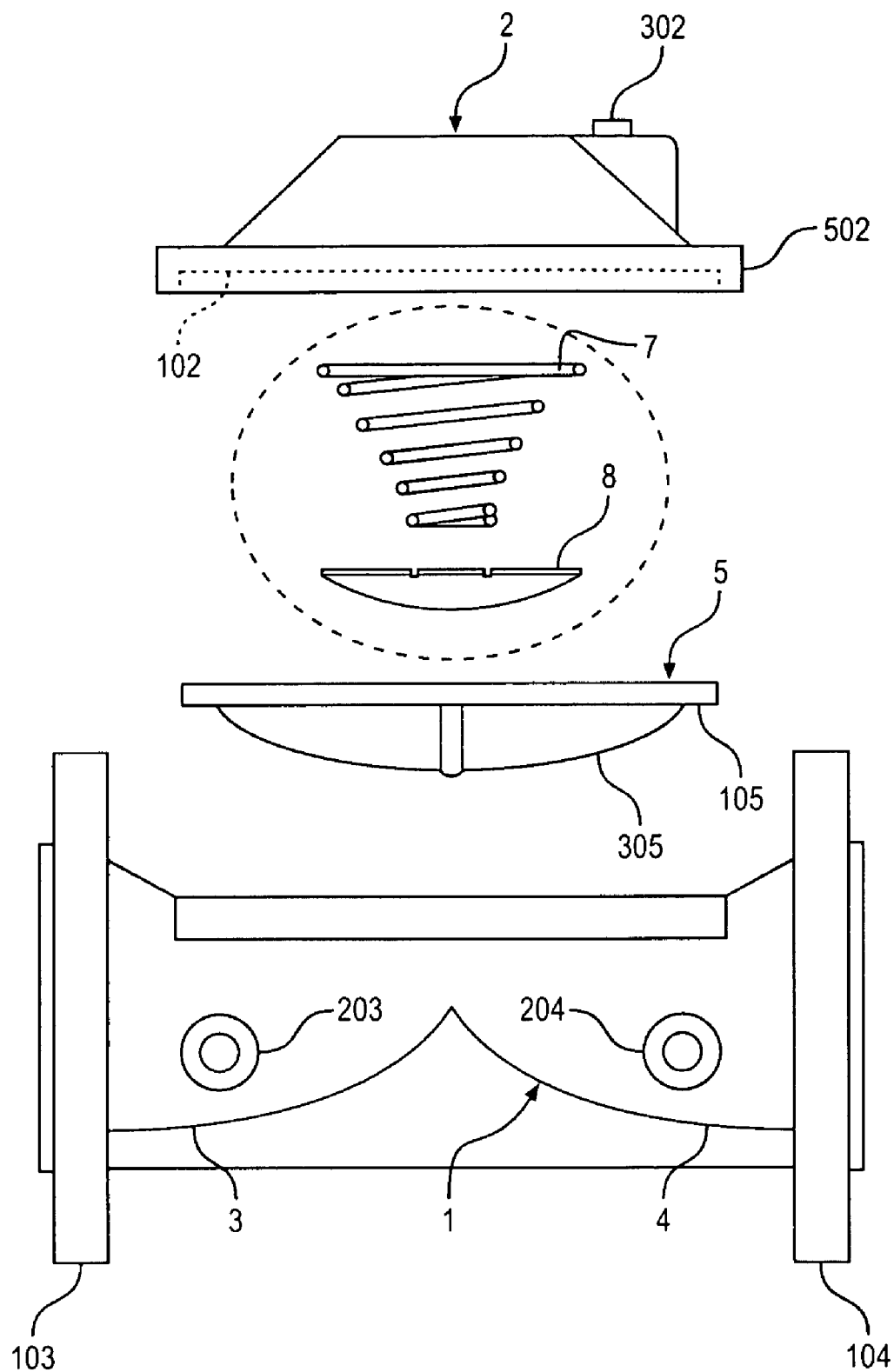
FIG. 1 is a side exploded view of a first embodiment of a valve according to this invention.
Figure 2:
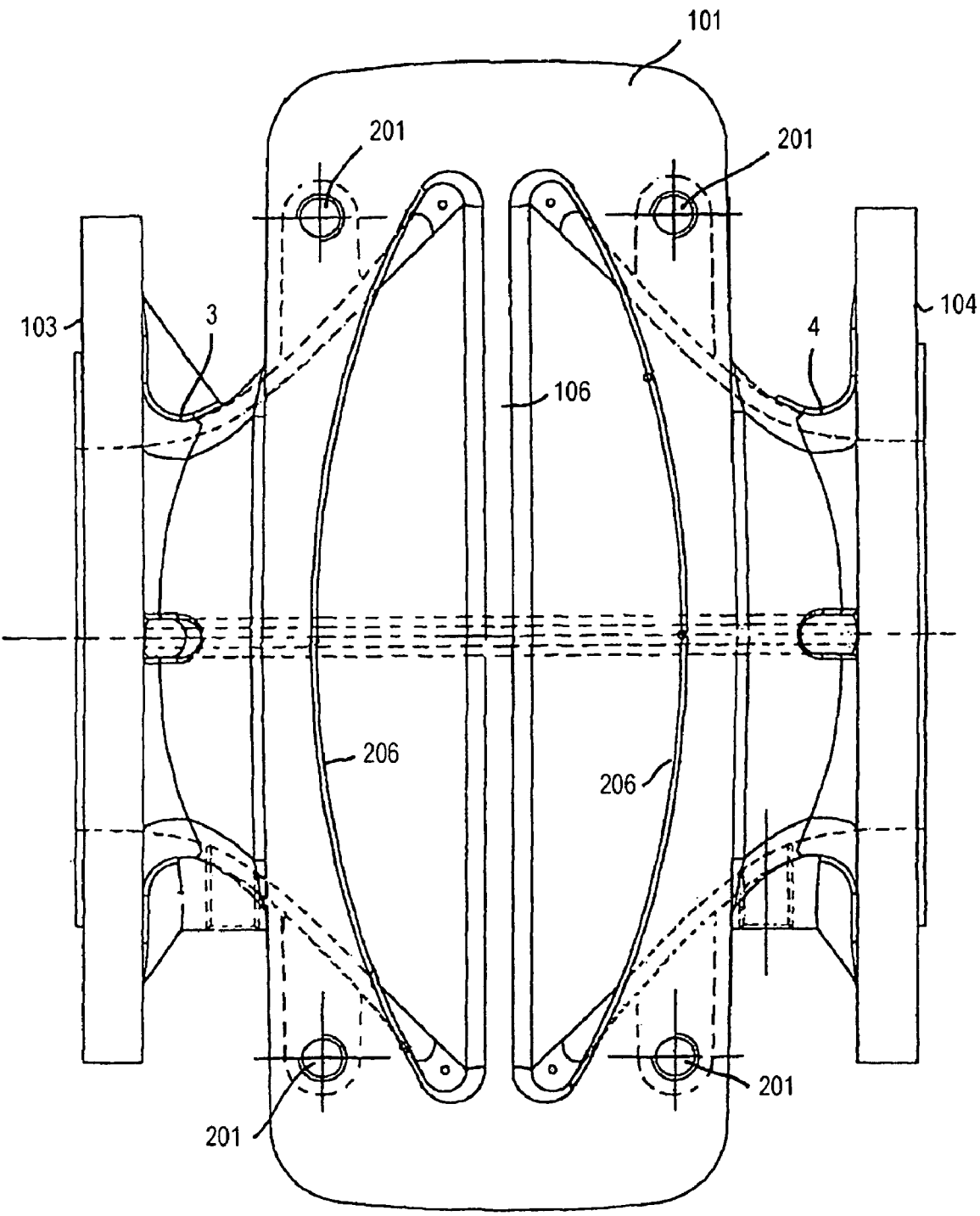
FIG. 2 is a top plan view of the valve body of FIG. 1.
Figure 3:
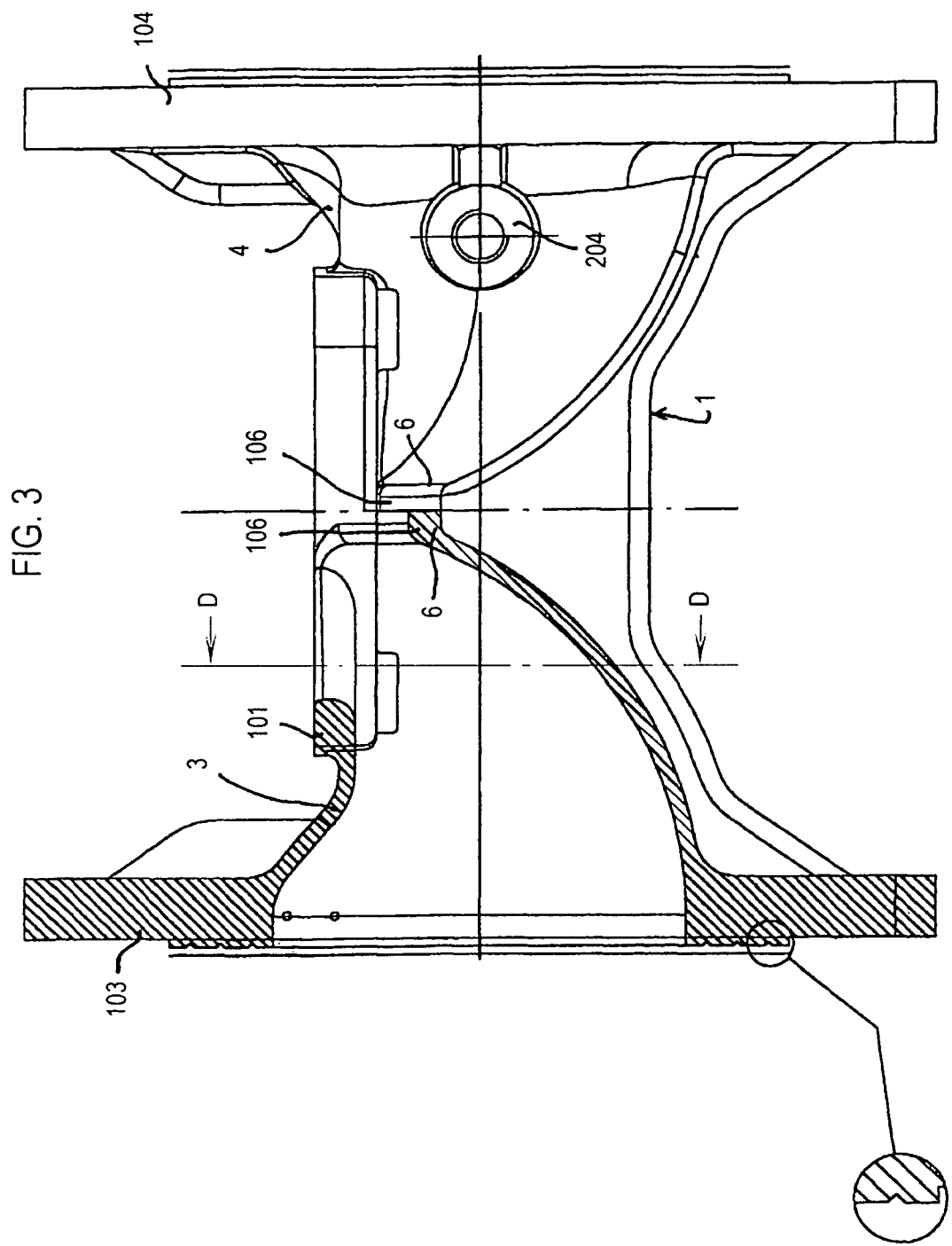
FIG. 3 is a side elevational view of the right half and an axial sectional view of the left half of the valve body of FIG. 1.
Figure 4:
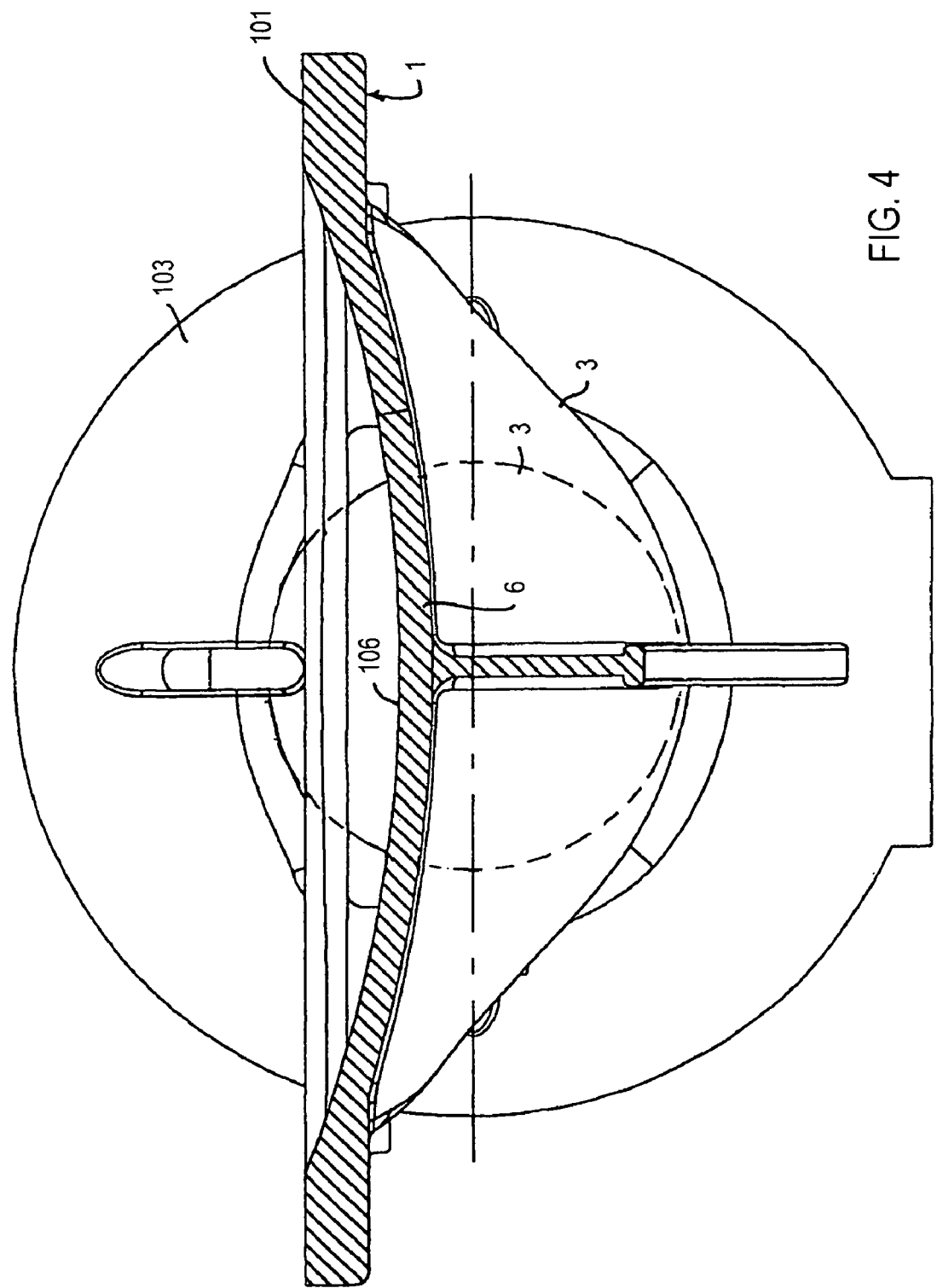
FIG. 4 is a cross sectional view of the central portion of the valve body of FIG. 1.
Figure 5:
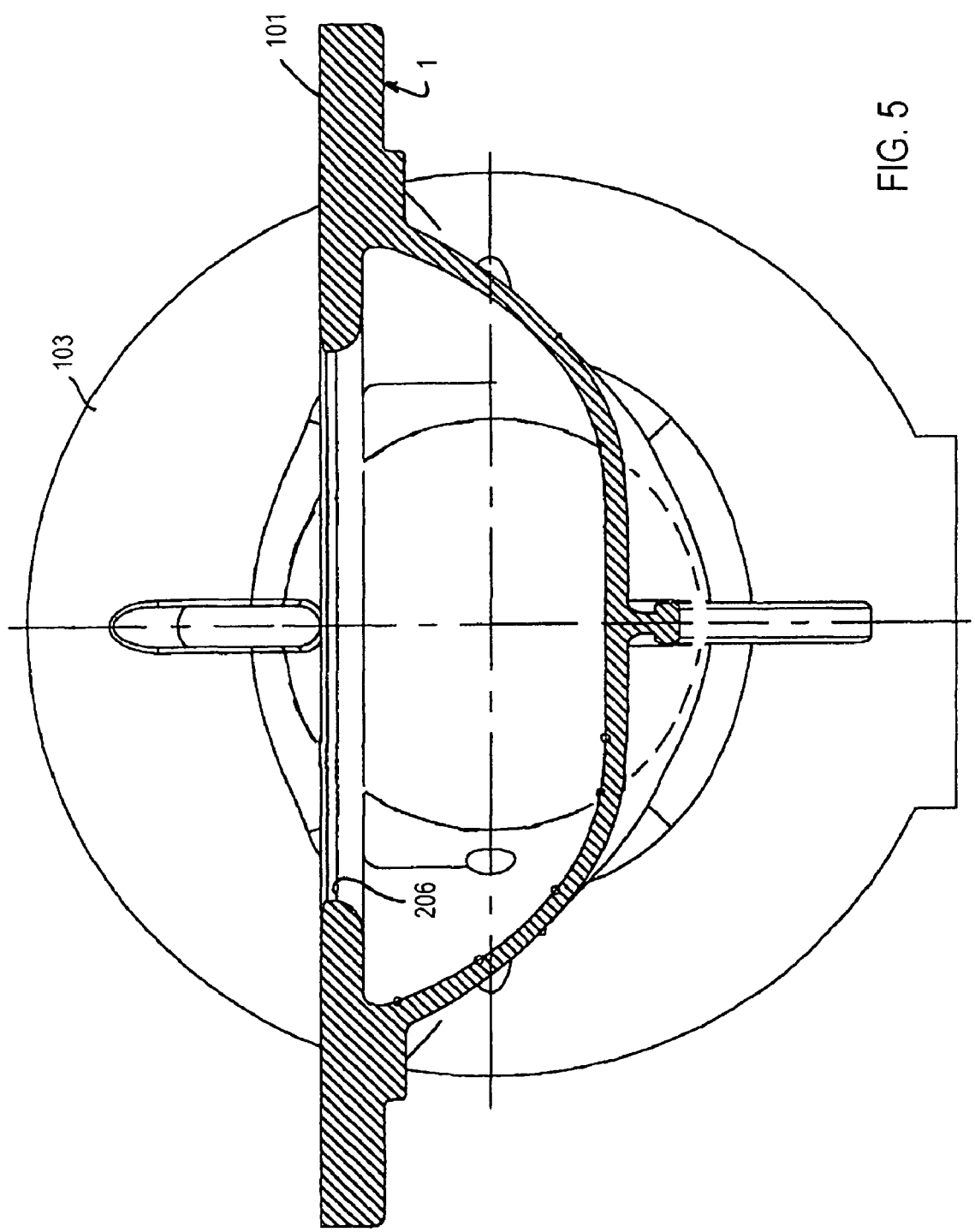
FIG. 5 is a cross-sectional view of the valve body as taken across plane D-D of FIG. 3.
Figure 7:
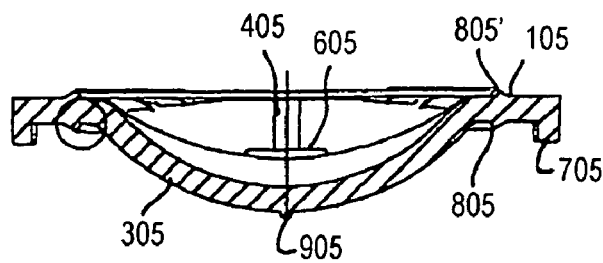
FIG. 7 is a sectional view, as taken along the shorter axis of the diaphragm of FIG. 6.

Referring to FIGS. 1-13, there is shown a first embodiment of the invention comprising a valve body 1, which is shown in a lower position, in FIG. 1, and an upper bell-shaped bonnet. The valve body 1 is composed of an inlet sleeve 3 and an outlet sleeve 4 which are each connected to an external port and have an arched profile and are substantially identical, and converge by a confluence curve that opens into a fluid flow chamber which is upwardly delimited by an open/close diaphragm 5 and is peripherally limited by a body clamping flange 101 for pressing diaphragm 5 against a corresponding peripheral bonnet clamping flange 102 of a bonnet 2, in order to secure diaphragm 5 onto the valve body 1. The bonnet 2 and the valve body 1 are sealably fastened by means of bolts (not shown) passing through holes 202 and 201 which are formed each at one of the four corners of said two flanges 102, 101 and with the interposition of a peripheral sealing flange 105 of the diaphragm, which also has corresponding holes 205 for the passage of bolts. Each of the two sleeves 3, 4 has, at its respective free end, a substantially circular flange 103, 104 to be pressed against a corresponding flange which is provided along the peripheral edge of the end of a tubular valve fastening duct. It should be noted that, for the purposes hereof, the terms upper and lower will only be referred to the drawings, and that the valve may be obviously mounted in any other position. Similarly, the terms inlet sleeve 3 and outlet sleeve 4 shall be only intended as conventional designations, no predetermined flow direction being provided.

The two sleeves 3, 4 have, starting from their respective free ends, a circular section which progressively widens in a direction transverse to the flow direction and progressively narrows in a direction substantially coincident with the radius of curvature, or bending radius, of each sleeve 3, 4, in such a manner that the flow chamber port, corresponding to the inner edge of the flange 101, has a substantially elliptic shape, whereas the clamping flange 101 has a substantially rectangular peripheral shape, with the longer side disposed in a direction transverse to the flow direction. The line of intersection of the two sleeves 3, 4, on the opposed sides thereof, forms an intermediate wall 6 which extends transverse to the flow direction and whose flattened and slightly concave upper surface 106, whose concavity is oriented toward the diaphragm 5, forms the valve seat 106, i.e. the surface against which the diaphragm 5 is pressed to prevent any fluid flow therethrough.

The shape of the peripheral flange 105 of the diaphragm 5 substantially corresponds to that of the flange 101 of the valve body 1, and is correspondingly substantially rectangular, and inscribes a central convex part 305, whose convexity is oriented toward the valve seat 106, which is made of a cup- or dome-shaped member, and more particularly of a member having the shape of a sector of an ellipsoid, disposed with its section plane corresponding with the flow chamber port. The clamping flange 102 of the bonnet 2 has a rectangular shape which corresponds to that of the flange 105 of the diaphragm 5 and of the flange 101 of the valve body 1.

It shall be noted that the flow rate through the flow chamber is maintained even though the port thereof is narrowed in the flow direction, thanks to the fact that it is correspondingly widened in a direction transverse to said flow direction.

The valve of the invention has the same operation as prior art valves. When the dome 305 of the diaphragm 5 is compressed against the valve seat 106, any fluid flow is prevented from flowing from the inlet sleeve 3 to the outlet sleeve 4 whereas, when the dome 305 is lifted and deformed toward the bonnet, free flow is allowed. The valve that is shown in the Figures is hydraulically operated and the compression of the dome 305 against the valve seat is achieved in a well-known manner, e.g. by using a three-way valve, by supplying a pressurized fluid in the chamber delimited by the diaphragm 5 and the bonnet 2, through an inlet port 302 formed in the bonnet 2, whereas the valve is opened by discharging said pressurized fluid. The fluid to be used is preferably the same fluid that flows in the valve and is withdrawn therefrom through an intake 203 formed on the inlet sleeve 3. The outlet sleeve 4 itself has an intake 204 which allows to use the valve in both fluid flow directions. It should be noted that in the prior art, when the dome 305 is compressed against the valve seat 106, the dome-shaped part, which extends through the port of the outlet sleeve 4, with the pressurized fluid supplied between the diaphragm 5 and the bonnet 2 pressing against the concave surface thereof, tends to bulge or bow out into the outlet sleeve 4, as in this type of valves the outlet sleeve port is substantially semicircular and the dome has a corresponding relatively long radius of curvature in the axial flow direction, whereas in the inventive valve said radius is much shorter, preventing the diaphragm from bulging, or bowing out.

Moreover, the overall shape of the diaphragm 5, i.e. a sector of an ellipsoid, improves resiliency over the whole geometry of the dome, when it changes from the opening condition, in which it is deformed toward the bonnet 2, to the normal idle condition, in which its convexity is oriented toward the valve seat 106.

The guiding principle of this invention also advantageously applies to mechanically operated valves using an opening/closing wheel. The enhancement of resiliency of the dome 305 also advantageously does not require a preloading spring 7, which is typically provided in a central position between the bonnet 2 and the dome 305 and acts thereon by exerting pressure against the valve seat 106.

Nevertheless, whenever this is necessary, the spring 7 may be provided, in which case advantages result from interposing a compressor element, or convex pressure member 8 between the lower end of said spring and the dome 305, the convex pressure member having a convexity with the same orientation as the dome 305 when the latter is in the idle condition, which distributes the pressure of the spring 7 over a larger surface as compared with that of the end of the spring 7, and protecting the dome 305 from an excessive mechanical stress. It shall be further noted that, thanks to the elliptic port of the flow chamber, the valve has a very small longitudinal size as compared with prior art valves.

The dome 305 has a central stiffening rib 405 oriented along the longer axis, on the concave side facing toward the bonnet 2. Also, one or more transverse ribs 505 are provided perpendicular to said central rib 405 oriented along the longer axis, which ribs extend parallel to the shorter axis of the section plane of the sector of ellipsoid which forms the dome 305. One of the transverse ribs 505 extends along said shorter axis of the dome that is shaped like a sector of an ellipsoid. The individual transverse ribs 505 are evenly distributed along the extension of the rib 405 which coincides with the longer axis of the dome 305. Any number of transverse ribs may be provided, depending on the extension along the longer axis and/or the shorter axis of the dome 305, even one single transverse rib, for instance the central transverse rib, along the shorter axis of the dome 305.

A variant embodiment of dome 305 provides, besides the rib 405 oriented along the longer axis, another transverse rib oriented along the shorter axis and one or more ribs which branch off the center and are oriented in such a manner as to divide the four quadrants of the dome 305, which are defined by the longer axis and the shorter axis of the dome 305, into identical or different webs.

Both variant embodiments of dome 305 may comprise an additional central stiffening member 605, having a circular shape, which possibly protects against the pressure exerted by the spring 7 in the rare instances in which the latter has to be provided. The ribs 405, 505 further help to enhance the resiliency of the dome 305. Both the ribs 405, 505 and the central stiffening member are obtained by locally thickening the wall of the dome 305, the thickness of the ribs 405, 505 progressively increasing toward the center of the dome 305, and decreasing toward the periphery of dome 305.

Figure 6:
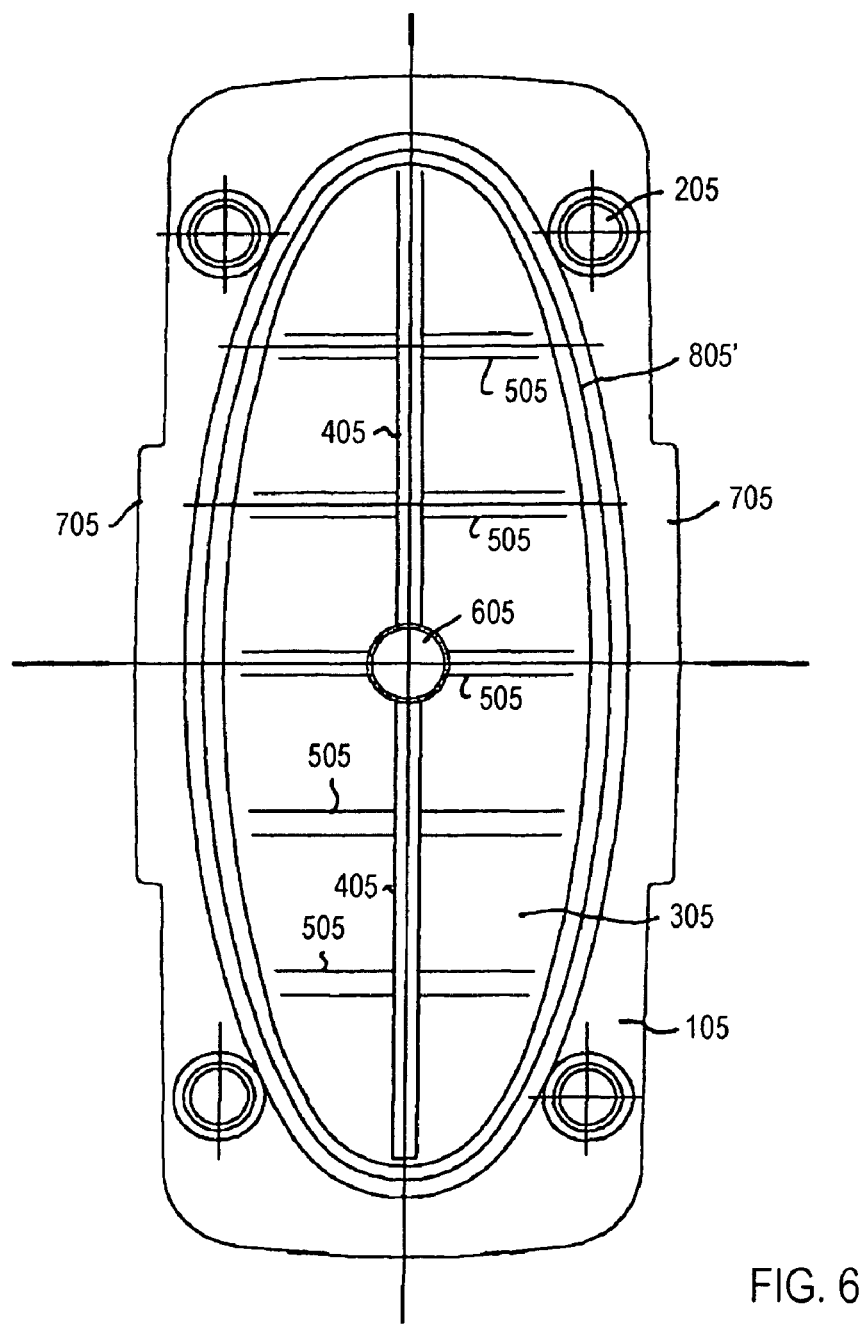
FIG. 6 is a top plan view of the diaphragm of the valve as shown in FIG. 1.
Figure 13:
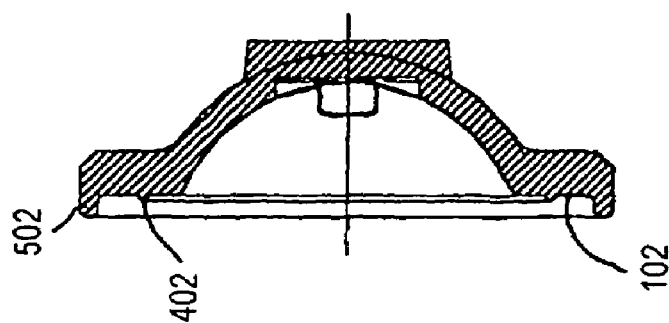
FIG. 13 is a sectional view, as taken along the shorter axis of the bonnet of FIG. 10.
Figure 10:
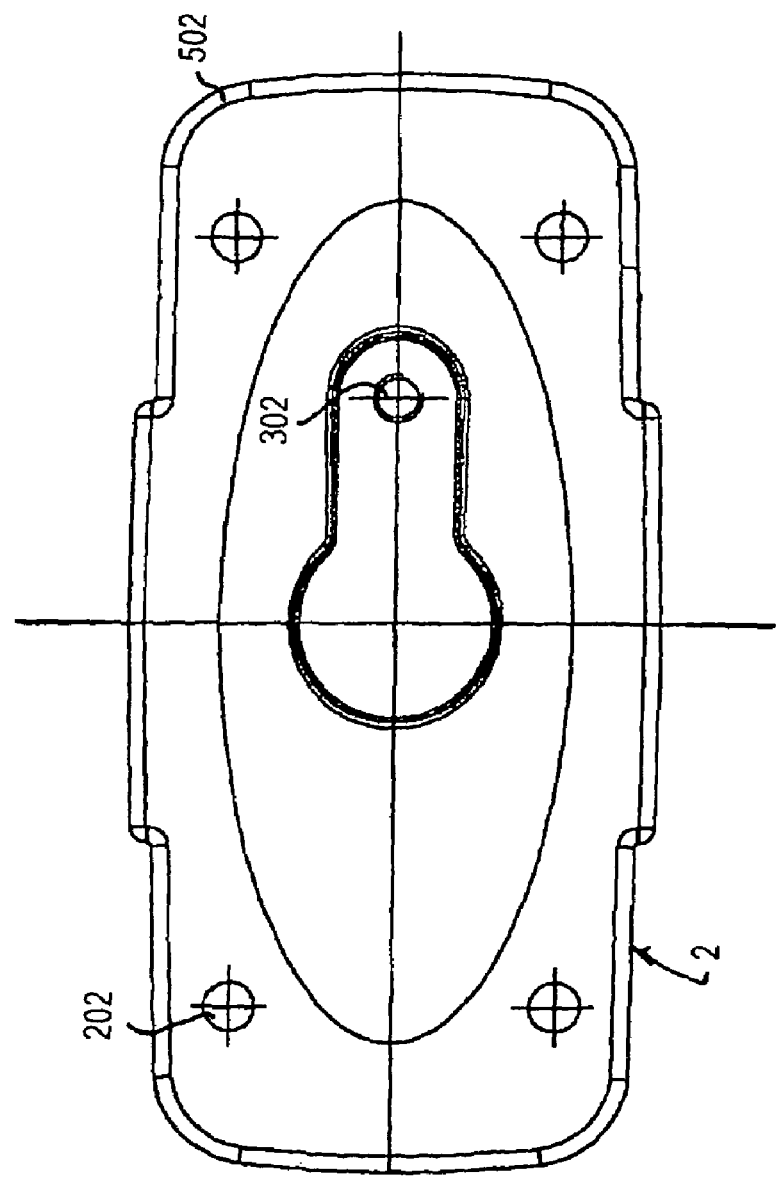
FIG. 10 is a top plan view of the bonnet part of the valve as shown in FIG. 1.
Figure 12:
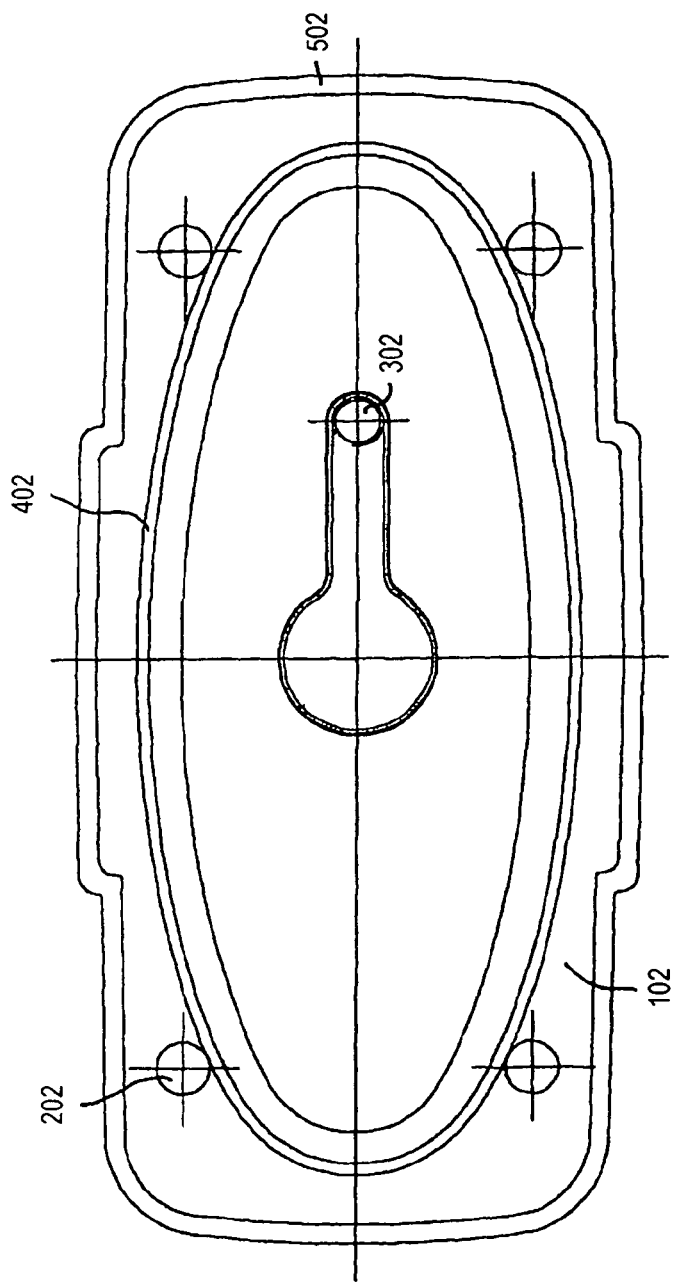
FIG. 12 is a bottom plan view of the bonnet part of the valve as shown in FIG. 1.
Figure 11:
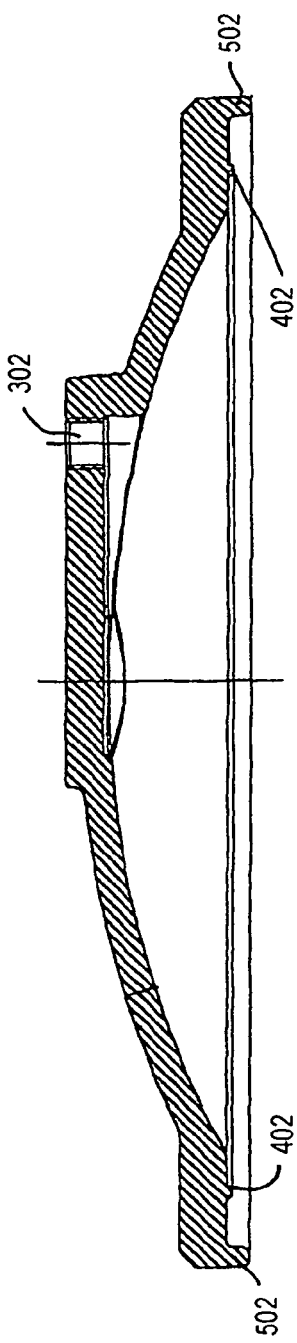
FIG. 11 is a sectional view, as taken along the longer axis, of the bonnet part of FIG. 10.

The sealing flange 105 may be provided with retaining means from preventing a sliding movement between body clamping flange 101 and bonnet retaining flange 102. As shown in FIG. 6, a retaining tab 705 may be provided along each longer side of the flange 105 of the diaphragm 5, in an intermediate position between the two through holes 205 for the coupling pins, which tab extends over the corresponding surface of the outer edge of the flange 101 of the valve body 1 and has a vertical orientation with respect to the plane of said flange 101, in such a manner as to secure the periphery of the flange 105 of the diaphragm 5 in position, and prevent it from sliding along the plane of the clamping flanges 102, 102 of the bonnet 2 and the valve body 1 respectively, and from being extracted from between said coupled flanges 102, 101.

Furthermore, the flange 105 of the diaphragm 5 has a continuous sealing lip 805, 805' on both faces, which has a substantially elliptic shape and extends along the peripheral edge of the central portion of dome 305, at a certain distance therefrom, and is deformed by mutual compression of the two flanges 102, 101 of the bonnet 2 and the body 1 respectively. A central, rounded lip seal 905 is provided on the convex side of the dome 305 facing toward the valve seat 106, in a position corresponding to the central rib 405 which, with the dome 305 compressed against said valve seat 106, acts as a compliant element and helps the dome 305 to adhere against said seat 106 and to prevent any fluid flow from the inlet sleeve 3 to the outlet sleeve 4.

A substantially elliptic projection 402 is provided on the clamping surface of the flange 102 of the bonnet 2, and may have discontinuity areas in the proximity of the peripheral holes 202. When projection 402 is pressed against the flange 101 of the valve body 1, projection 402 extends along the peripheral edge of the dome 305, and compresses a corresponding portion of the flange 105 of the diaphragm 5, further preventing it from being pulled out of position.

The peripheral edge of the flange 102 of the bonnet 2 has a continuous tab that extends over the corresponding surface of the outer edge of the flange 101 of the valve body 1, which has a vertical orientation with respect to the plane of said flange 101 and has the function of centering the bonnet 2 and of laterally limiting any outward extension of the flange 105 of the diaphragm 5.

The diaphragm valve in this embodiment of the invention has the considerable advantage of allowing the use of plastic in the fabrication of the valve. In prior art, diaphragm valves are made of metal, particularly cast iron. In this case, the fabrication process requires the use of a disposable mold, whereby undercuts in the valve design cause no problem. The use of plastic in the fabrication of prior art problems involves instead two problems. First, in the conventional circular diaphragm version, valve sizes do not allow the use of plastic, due to the limitations in mechanical strength of this material. Further, any structural change in the design of these valves for the purpose of manufacturing them out of plastic and of adopting shape arrangements providing a stronger structure, would cause serious problems in terms of plastic valve sizes, as well as an increased mold complexity.

However, this embodiment of the invention provides for a valve configuration, particularly of the body thereof, that allows it to be made out of plastic, without causing any problems regarding sizes and fabrication molds and ensuring the required mechanical strength.

The smaller valve sizes provided by this embodiment of invention enables the manufacture of the valve body in such a manner as to meet small space requirements and to provide higher stiffness and mechanical strength.

FIGS. 14 to 20 show a second embodiment of the invention that is specially suited for a valve made of a plastic material. The inventive concept allowing the reduction of the diameter of the diaphragm and the related flange for clamping the latter between the valve body and the bonnet is substantially identical to that of the previous embodiment.

Figure 14:
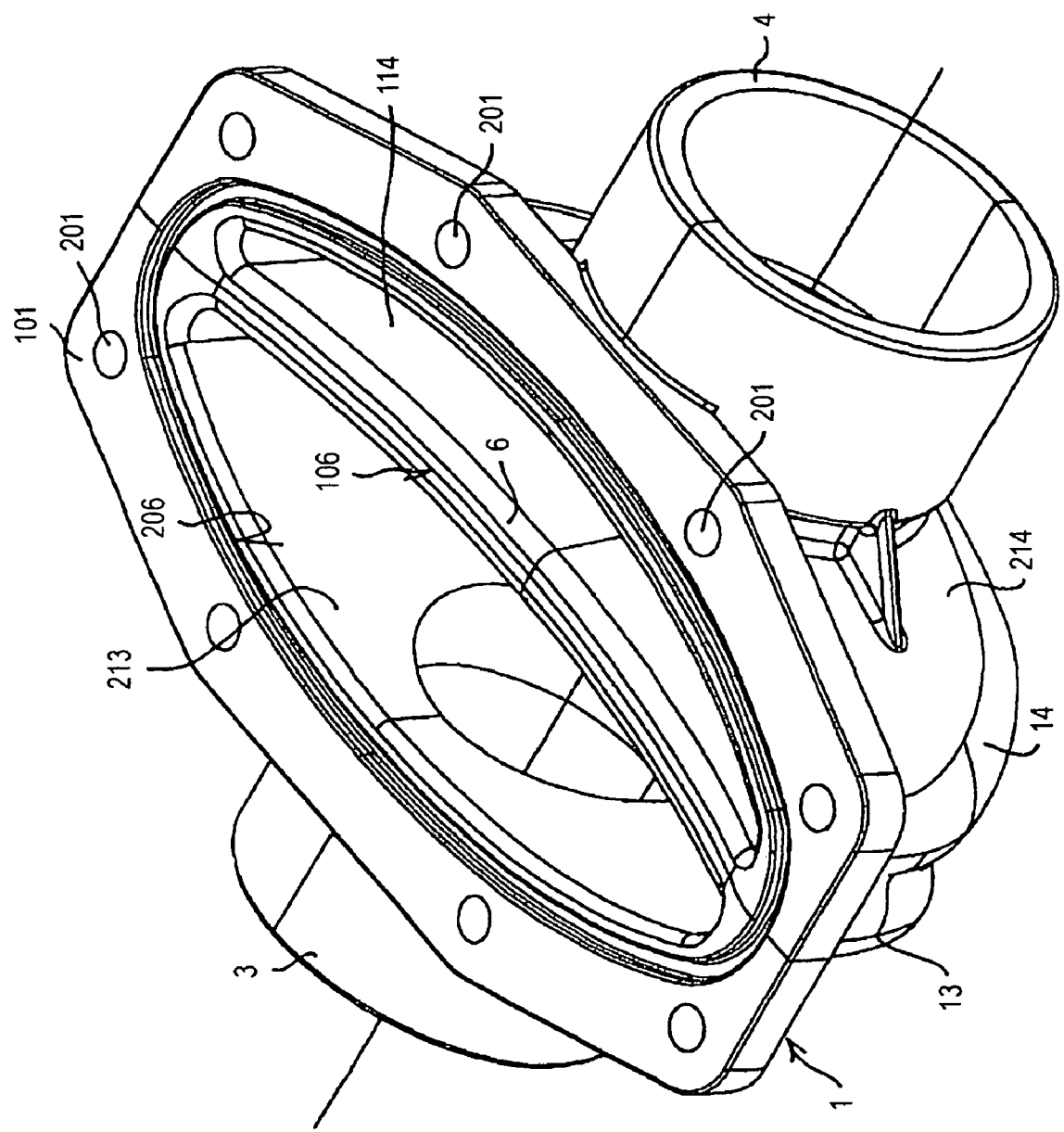
FIG. 14 is a perspective view of a diaphragm valve according to a second embodiment of the valve, which is especially designed to be made out of plastic.
Figure 15:
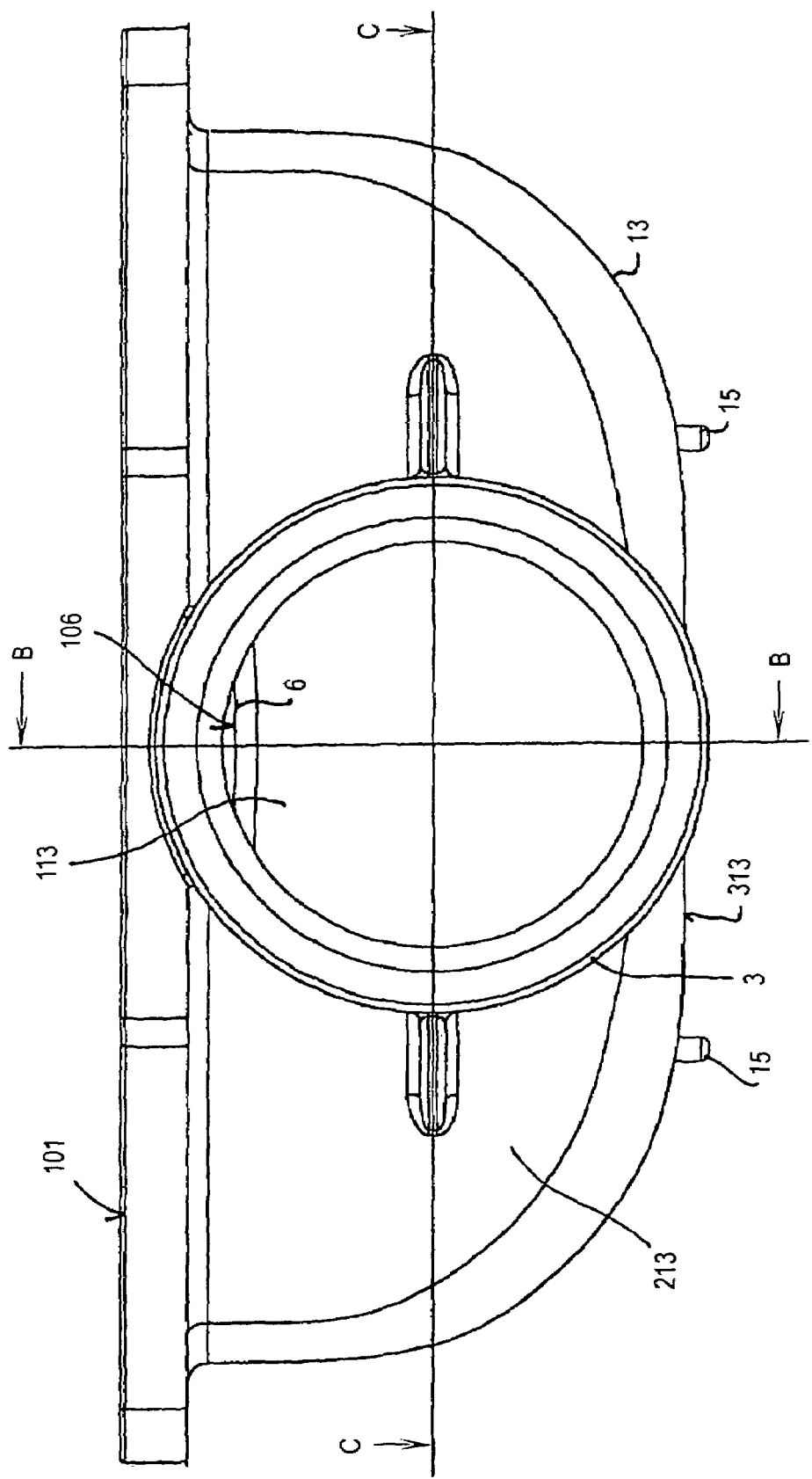
FIGS. 15 to 18 are four views, of which two are side views, one is a top plan view and one is a bottom plan view, of the valve as shown in FIG. 14.
Figure 16:
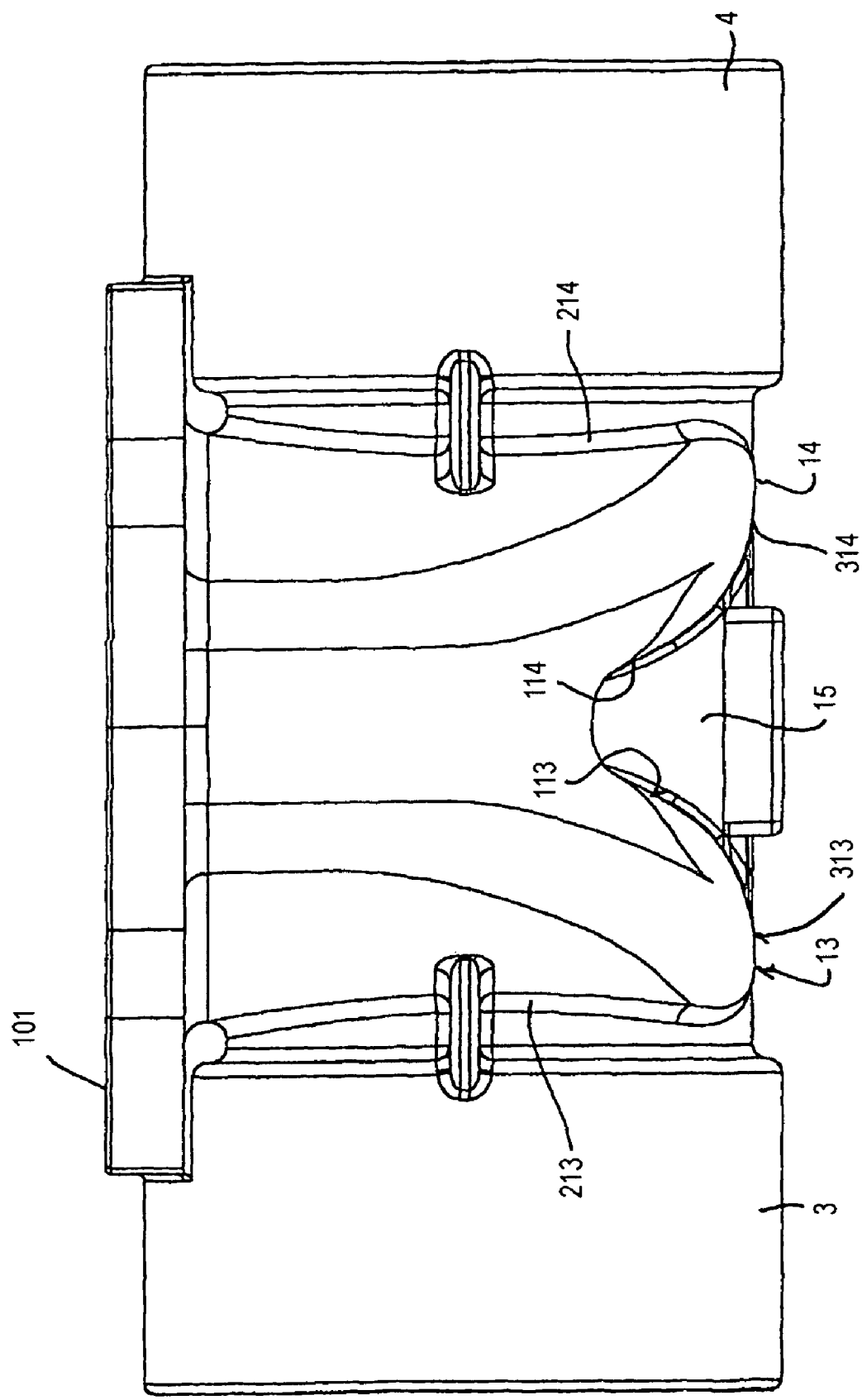
Figure 17:
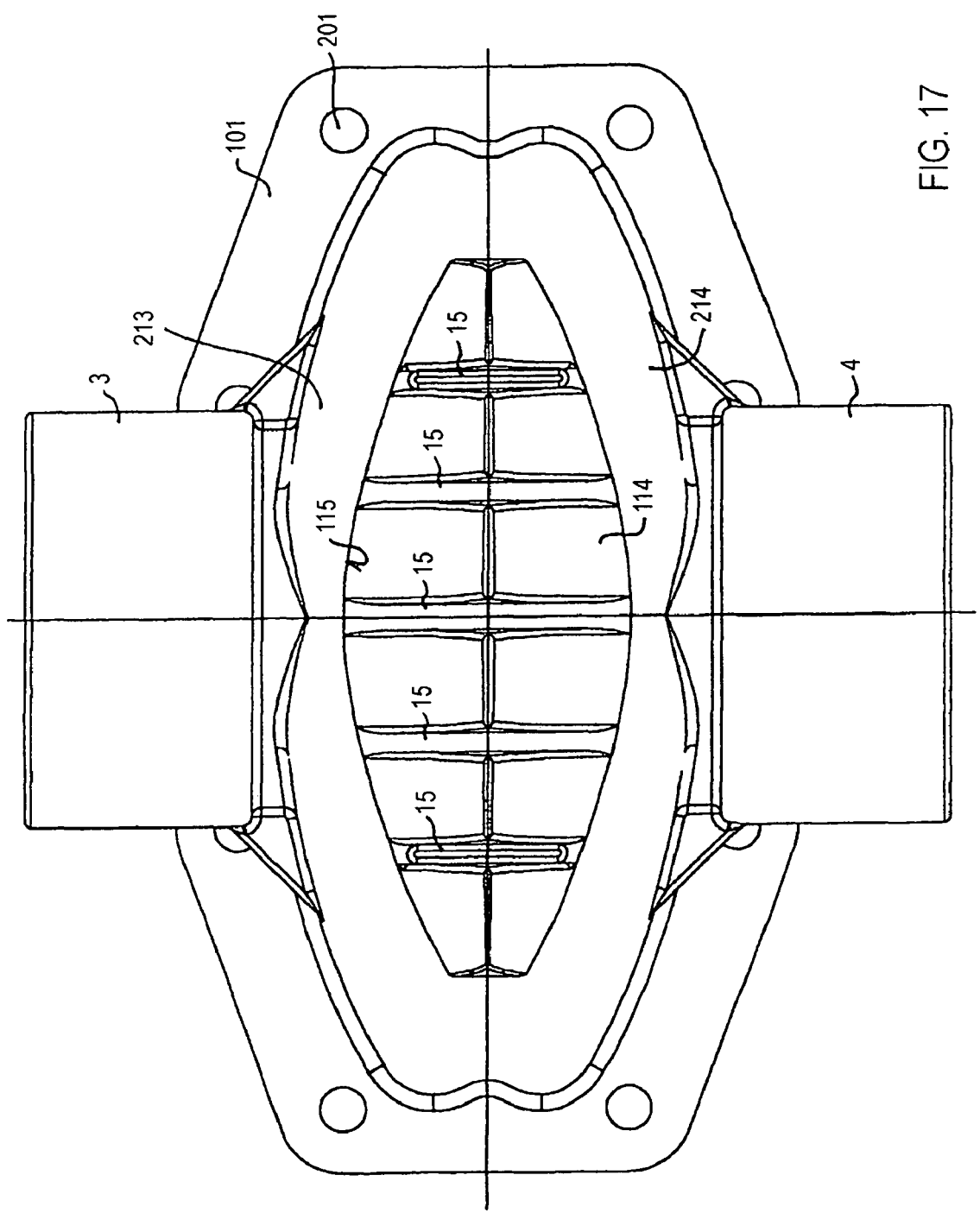
Figure 20:
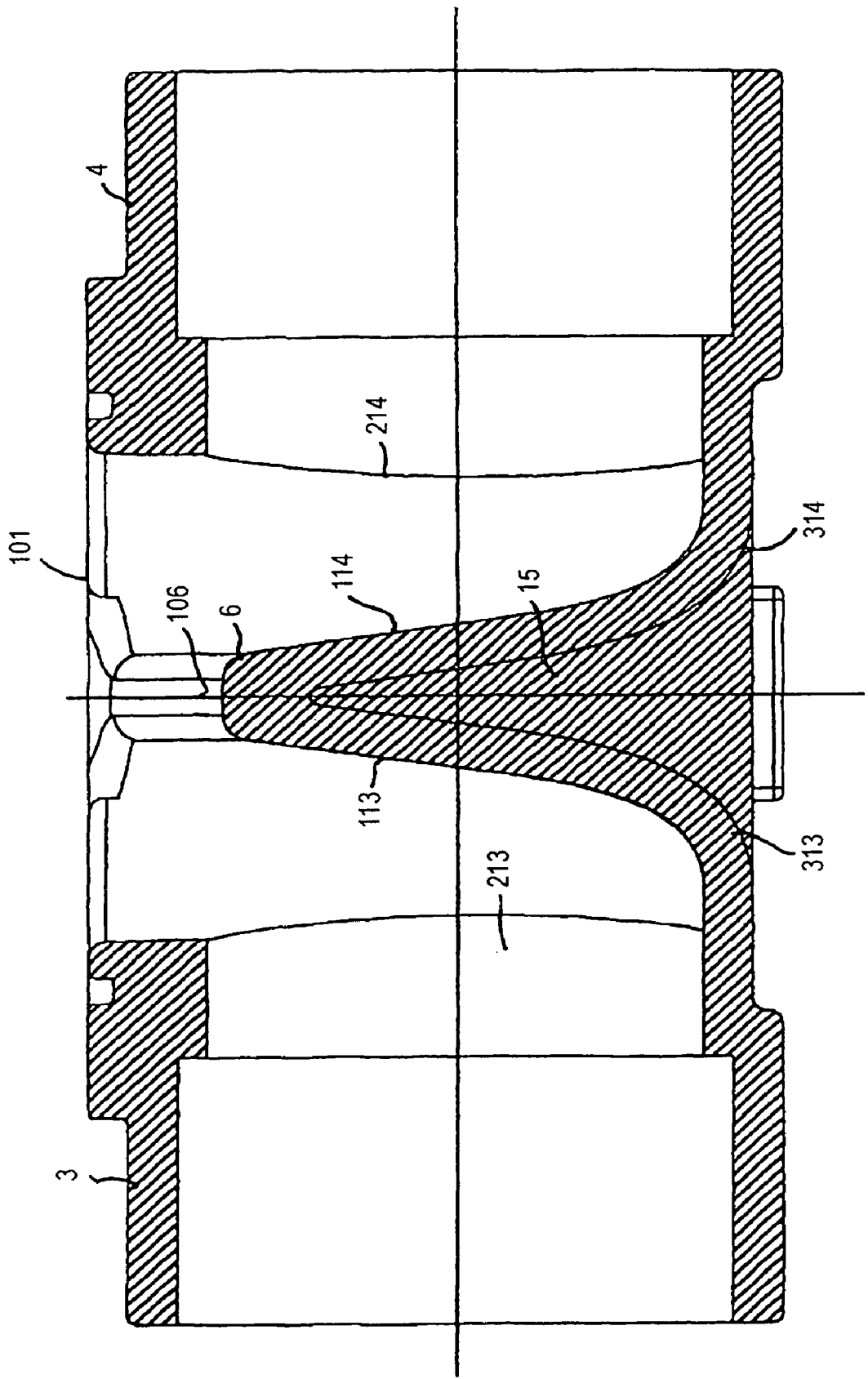
FIG. 20 is a section taken along line B-B in FIG. 15.
Figure 21:
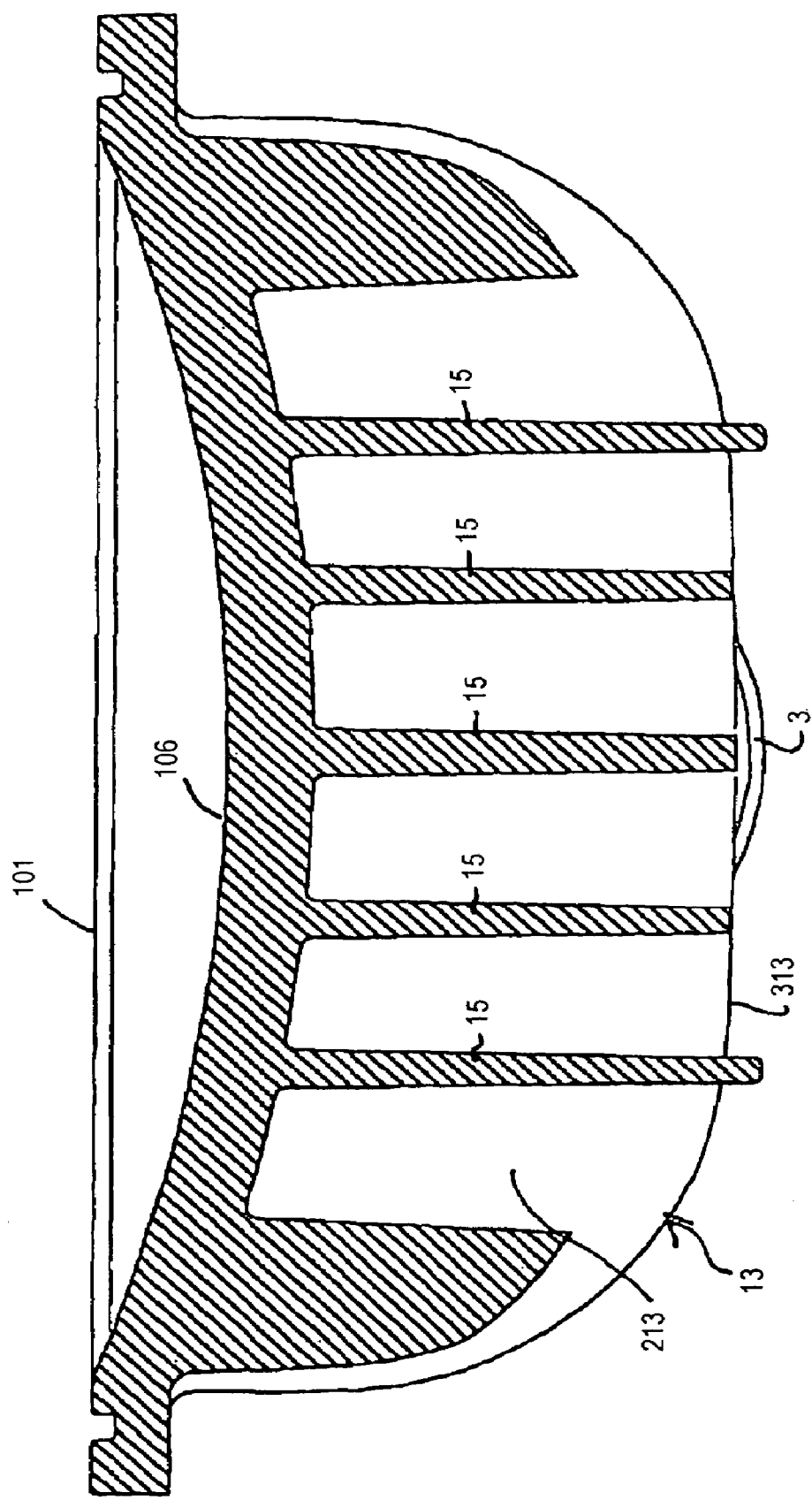
FIG. 21 is a cross sectional view of the valve as taken along plane A-A of FIG. 18.

However, in plastic valves, instead of the two inlet and outlet sleeves 3, 4 which are curved and spread one toward the other, to form, in the intersecting portion, the arcuate surface that forms both the valve seat 106 and the flow chamber, and which have an aperture flattened in the flow direction, particularly having an elliptic shape that corresponds to the elliptic dome 305 of the diaphragm open/close element 5, the two sleeves 3, 4 open into two pocket-like chambers 13, 14. The openings of the pocket-like chambers, whose axes are perpendicular to those of the inlet ends of the sleeves 3, 4 form, like in the valve of the first embodiment, a common aperture, defined by the edge of the fluid flow chamber that is flattened in the axial flow direction (an elliptic aperture 206 is shown in FIG. 14) and surrounded by the flange 101, inscribable in a rectangle, whereto the bonnet 2 may be sealably secured with the interposition of the peripheral flange 105 of the diaphragm open/close element 5. As shown in FIG. 20, the valve seat 106 has, like in the first embodiment, an arched, saddle-shaped surface, formed by the two opposed walls transverse to the flow direction 113, 114 of the two pockets 13, 14 which end with an upper edge, arched from the surface of the peripheral flange 101 towards the center of the valve, sloping down from both ends level with the peripheral flange 101 to the central area, with an arched and progressive profile, the edges of said two opposed transverse walls 113, 114 being connected by a flattened connection edge which forms the arched valve seat 106.

Figure 18:
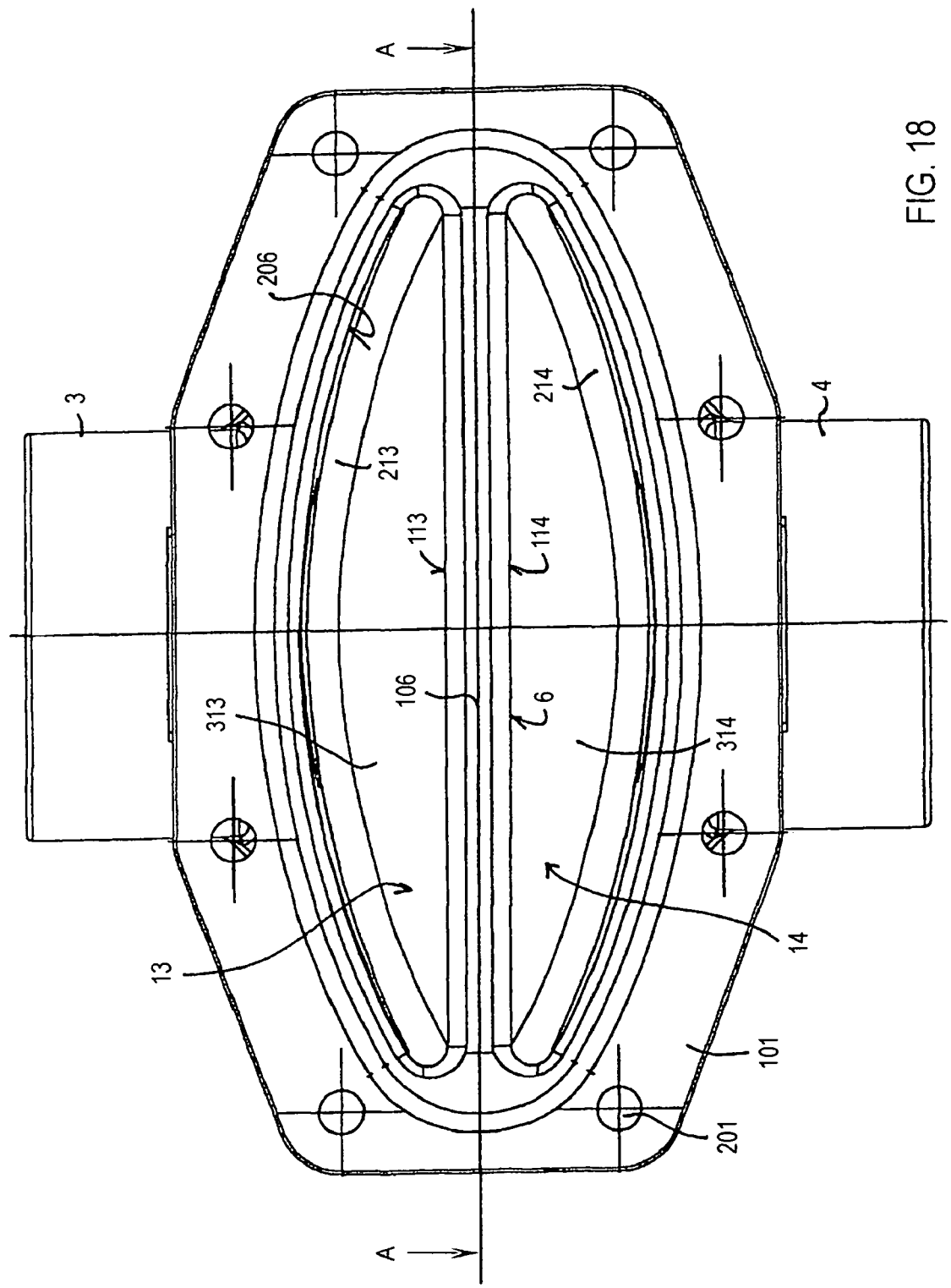
Figure 19:
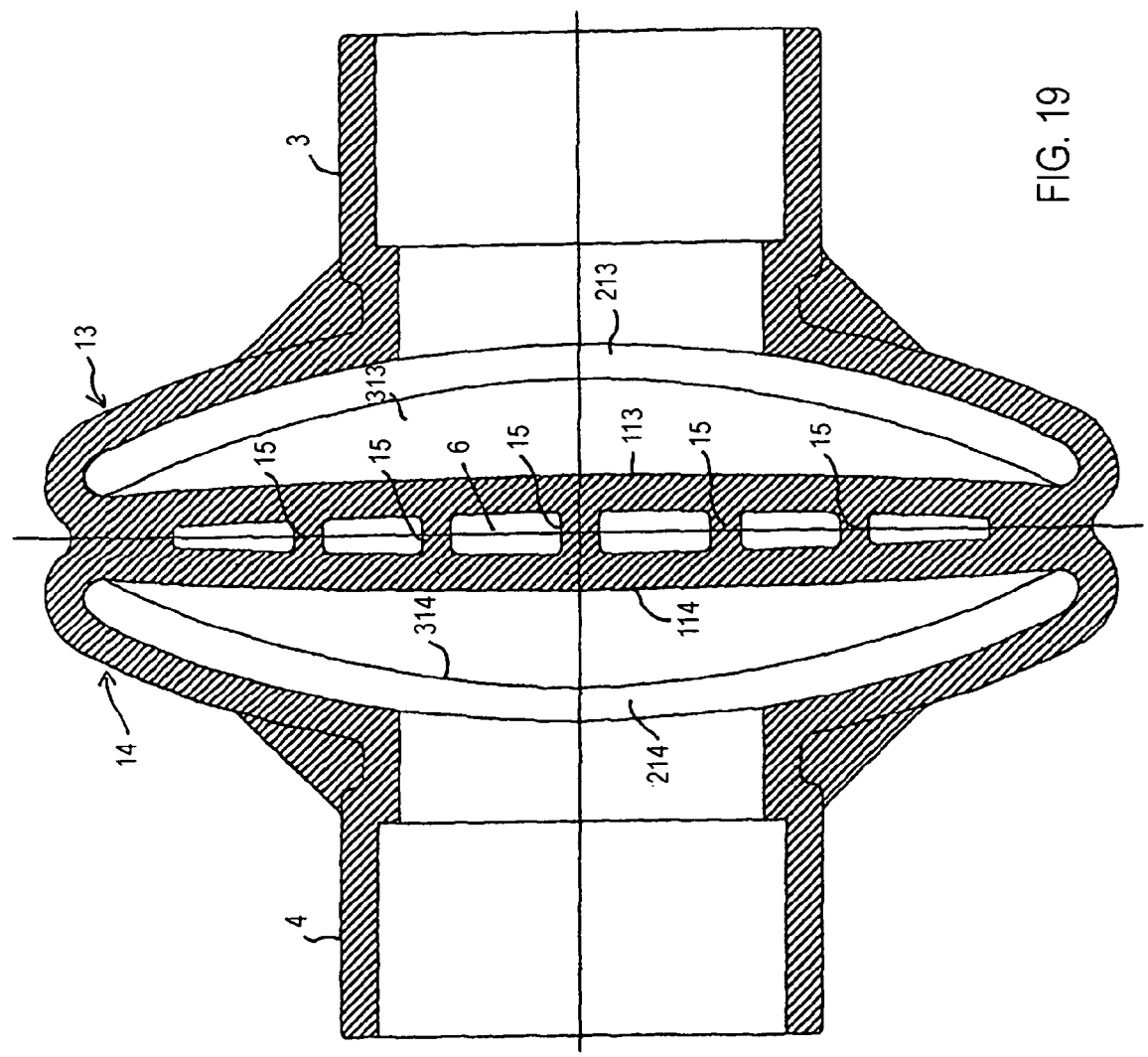
FIG. 19 is a section taken along plane C-C in FIG. 15.

As shown in FIGS. 14 and 18, the shape of the two pockets 13, 14 substantially corresponds to half the peripheral edge 206 of the clamping flange 101.

The sleeves 3, 4 extend substantially perpendicular to the outer walls 213, 214 that are parallel or substantially parallel to the opposed walls 113, 114 of the two pockets 13, 14.

The two opposed walls 113, 114 of the two pocket like chambers 13, 14 are substantially parallel and diverge at the closed bottom with arched or rounded walls 313, 314 toward the corresponding opposite outer wall 213, 214.

As is apparent, particularly from FIGS. 16, 17, 19, 20, 21, a number of transverse ribs 15 are provided between the two opposed walls 114, 113 of the two pocket-like chambers 13, 14, which ribs are oriented in the flow direction or along the shorter axis of the flattened or elliptic shape of the edge 206 of the flange 101. The ribs 15 extend in the hollow portion formed by the two facing walls 113, 114 and the outer side of the arched edge that forms the valve seat 106 and progressively widen as the relative distance between the two walls 113, 114 increases, until they end substantially flush with the bottom side of the two pocket-like chambers 13, 14. All, some or only two of the transverse ribs 15 may slightly project outside of the bottom side of the pocket chambers 13, 14, thereby forming two support elements, or feet.

The bonnet 2, not shown in detail, is fabricated in the same manner as previously described with reference to FIGS. 1 to 13. The bonnet may be made of plastic or sheet metal, preferably stainless steel, which is appropriately shaped by a drawing process. The diaphragm itself is unchanged with respect to that described in the first embodiment.

One difference from the first embodiment, as shown in FIGS. 1 to 13, consists in that, in the second embodiment as shown in FIGS. 14 to 21, the flanges 101, 105 and 102 of the valve body, of the diaphragm 5 and of the bonnet respectively, have a greater number of through holes for bolt and nut pairs. This is especially necessary for large size valves, as both the sheet metal bonnet and the plastic bonnet that are provided in combination with the flange of the valve body, itself made of plastic, are relatively elastic and might not ensure the required sealing action, especially on the longer side, when only four fastening points are provided at the four corners of the two opposite shorter ends of said flanges.

It shall be noted, regarding the first embodiment, that no large-sized diaphragm valve is currently known to be made of plastic, the structure thereof being unuitable for this type of material. The novel design of the inventive diaphragm open/close element and, correspondingly, of the valve body, obviates the technical problems associated with the manufacture of diaphragm valves of plastic.

The invention is not limited to the embodiment described and illustrated herein, but the teachings of this invention are applicable to a variety of valve types, such as manually, mechanically, hydraulically, or servo actuated, without departure from the guiding principles disclosed above and claimed below.

If the valve is mechanically operated, a compressor element may be provided on the side of the dome facing the bonnet, the compressor element having a pressing surface of a shape complementary to the bonnet and being rotatably linked to the inner end of a slidable control system passing through a hole formed in the bonnet. If the valve is hydraulically operated, a pressurized fluid (preferably the same fluid supplied to the inlet sleeve of the valve) is supplied into the space between the bonnet and the dome, in order to compress the dome against the valve seat. Likewise, the pressurized fluid may be discharged from such space, opening the valve.

Hence, for instance, the reduction of valve space requirements as provided by this invention in the flow direction enables an integrated valve-and-meter device in which, instead of providing a separate meter with means for sealably fitting it onto the inlet sleeve of the valve, the inlet sleeve of the valve is extended beyond the normal size and is integrated therein or forms itself the housing of a meter part.

Similarly, further operating units may be provided, integral with the valve. The particular reduced size construction of the inventive valve allows the construction of particularly compact integrated devices.

The invention claimed is:

1. A diaphragm valve comprising:
 a valve body having an inlet sleeve and an outlet sleeve each connected to an external entry port, the inlet sleeve and the outlet sleeve each having arched profiles in the longitudinal direction that converge to form a weir and a circular cross-section at the external entry port;
 a fluid flow chamber where the inlet sleeve and the outlet sleeve converge, the fluid chamber having one part integral with the valve body and peripherally delimited by a body clamping flange, and another part comprising a bonnet to be sealably secured onto said valve body, the bonnet having a peripheral bonnet clamping flange substantially coincident with the body clamping flange;
 a valve seat defined by the weir, the valve seat having an arched profile of substantially elliptical curvature and a flattened central surface; and
 an open/close element comprising a single level diaphragm made of an elastomeric material, the diaphragm comprising a peripheral sealing flange to be clamped between the body clamping flange and the bonnet clamping flange, said sealing flange being connected to a central dome, the dome having a convex side and a concave side, the concave side being oriented, in an unstressed position, toward the valve seat,
 wherein the cross sections of the inlet sleeve and the outlet sleeve each have a semi-elliptical shape at the respective openings into the fluid flow chamber, the semi-elliptical shape being defined by an arched portion on the outer side and a flattened portion on the inner side, the semi-elliptical shapes converging at the valve seat and providing the substantially elliptical curvature, wherein the sealing flange of the diaphragm has an elongated shape inscribing the dome of the diaphragm, wherein the sealing flange is joined to the dome along a substantially elliptical edge having a longer central axis and a shorter central axis, and wherein the dome is substantially shaped like a sector of an ellipsoid so to cooperate with the valve seat, the dome comprising a plurality of ribs disposed in symmetrical position essentially parallel to a shorter axis of the dome on a side of the dome facing the bonnet and further comprising a rib disposed substantially along a longer axis of the dome on the side of the dome facing the bonnet.

2. The valve as claimed in claim 1, wherein the inlet sleeve and the outlet sleeve each have a cross section progressively widening in the direction substantially perpendicular to the flow direction and to the radius of curvature of the arched profile and progressively narrowing in the longitudinal direction of the inlet and outlet sleeves, and wherein the flow chamber port has a shape that is elongated in the direction perpendicular to the longitudinal axis of the diaphragm valve, the sealing flange having a shape matching the shape of the bonnet clamping flange and inscribing the dome of the diaphragm.

3. The valve as claimed in claim 1, further comprising one or more ribs disposed between the shorter and the longer axes of the dome.

4. The valve as claimed in claim 1, further comprising a centrally disposed circular stiffening member on the side of the dome facing the bonnet.

5. The valve as claimed in claim 1, wherein the dome has a constant thickness, and wherein at least some of the plurality of ribs have a thickness progressively increasing toward the center of the dome.

6. The valve as claimed in claim 1, further comprising means for retaining the periphery of the sealing flange in position, thereby preventing the sealing flange from sliding along the junction of the bonnet clamping flange and the body clamping flange.

7. The valve as claimed in claim 6, wherein said retaining means comprise one or more retaining projections extending in a substantially perpendicular direction from the sealing flange at the outer edges of the bonnet clamping flange.

8. The valve as claimed in claim 6, wherein the retaining means comprise two retaining tabs, each being provided along one of the longer sides of the sealing flange and extending over the corresponding surface of the outer edge of the body clamping flange with an orientation substantially perpendicular to the plane of said body clamping flange.

9. The valve as claimed in claim 6, wherein the retaining means comprise one or more bosses provided on the clamping surface of the body clamping flange and bonnet clamping flange, the one or more bosses compressing the corresponding portion of the sealing flange and further preventing the sealing flange from sliding out of position.

10. The valve as claimed in claim 6, wherein said retaining means comprise a substantially elliptic projection provided on the bonnet clamping flange, the substantially elliptic projection being positioned to be substantially parallel to the dome and to press against the sealing flange.

11. The valve as claimed in claim 1, further comprising means for centering the bonnet with respect to the valve body and for laterally limiting any outward extension of the sealing flange.

12. The valve as claimed in claim 11, wherein said means for centering comprise one or more retaining teeth arranged along the outer peripheral edge of the bonnet clamping flange and extending over the surface of the peripheral edge of the body clamping flange with a substantially perpendicular orientation to the plane of the body clamping flange.

13. The valve as claimed in claim 12, wherein said means for centering comprise a tab continuously extending at least along a portion of the peripheral edge of the bonnet clamping flange and extending over the corresponding surface of the outer edge of the body clamping flange with a substantially perpendicular orientation with respect to the plane of said body clamping flange.

14. The valve as claimed in claim 1, wherein the sealing flange has at least one lip seal extending parallel to the peripheral edge of the dome and at a distance therefrom.

15. The valve as claimed in claim 1, further comprising a central, rounded lip seal on the side of the dome facing the valve seat, the lip seal extending along the longer axis of the dome and acting as a compliant element favoring the adhesion of the dome against the valve seat, so to prevent any fluid flow from the inlet sleeve to the outlet sleeve.

16. The valve as claimed in claim 1, further comprising a rib in an intermediate position at the opening of the outlet sleeve into the flow chamber, the rib being oriented in the flow direction and being substantially perpendicular to the plane tangent to the lower apex of the surface of the valve seat, the rib having a surface at the edge facing the dome that is flattened and curved to cooperate with the dome, so to prevent the dome from bulging when compressed against the valve seat.

17. The valve as claimed in claim 1, wherein the valve is a manually actuated valve, a mechanically actuated valve, a hydraulically actuated valve, or a servo actuated valve.

18. The valve as claimed in claim 17, wherein the valve is a mechanically actuated valve, further comprising a compressor element on the side of the dome acing the bonnet, the compressor element having a pressing surface of a shape complementary to the dome, the compressor being rotatably linked to the inner end of a slidable control stem which is passed through a hole formed in the bonnet.

19. The valve as claimed in claim 17, wherein the valve is a hydraulically operated valve, further comprising means for supplying a pressurized fluid between the bonnet and the dome for compressing the dome against the valve seat and close the valve, and further comprising means for discharging said pressurized fluid and open the valve.

20. The valve as claimed in claim 1, further comprising means for elastically preloading the dome of the diaphragm towards the valve seat.

21. The valve as claimed in claim 1, wherein the valve body is made of plastic, the fluid flow chamber further comprising two pocket-like chambers closed at their external sides and open at their internal sides, the pocket-like chambers being disposed in adjacent positions, the internal sides of the pocket-like chambers being connected to a common opening of the fluid flow chamber the common opening having an elongated shape in the flow direction and being surrounded by the body clamping flange of a cooperating elongated shape, the two pocket-like chambers having each two opposed walls and having upper edges of concave shape that face the opening and that slope in the direction of the central area of the fluid flow chamber from the two opposing points substantially level with the edge of the opening, said upper edges of the two opposed walls being connected to each other by a surface forming the valve seat.

22. The valve as claimed in claim 21, wherein the walls of the pocket-like chambers are substantially perpendicular to the flow direction, and wherein the inlet sleeve and the outlet sleeve have longitudinal axes substantially perpendicular to the walls of the pocket-like chambers.

23. The valve as claimed in claim 1, wherein the bonnet is made of a resilient material, and wherein the resilient materials is plastic or sheet metal.

24. The valve as claimed in claim 1, wherein the sealing flange is clamped between the body clamping flange and the bonnet clamping flange by four or more fastening bolts in the proximity of the corners of the shorter sides of said body clamping and bonnet clamping flanges.

25. The valve as claimed in claimed 24, wherein the body clamping flange and the bonnet clamping flange have substantially rectangular shapes.

26. The valve as claimed in claim 1, further comprising a measuring device integrated with the inlet sleeve of the valve body.

27. A diaphragm valve comprising:
a valve body having an inlet sleeve and an outlet sleeve each connected to an external entry port, the inlet sleeve and the outlet sleeve each having arched profiles in the longitudinal direction that converge to form a weir and a circular cross-section at the external entry port;
a fluid flow chamber where the inlet sleeve and the outlet sleeve converge, the fluid chamber having one part integral with the valve body and peripherally delimited by a body clamping flange, and another part comprising a bonnet to be sealably secured onto said valve body, the bonnet having a peripheral bonnet clamping flange coincident with the body clamping flange;
a valve seat defined by the weir, the valve seat having an arched profile of substantially elliptical curvature and a flattened central surface; and
an open/close element comprising a diaphragm made of an elastomeric material, the diaphragm comprising a peripheral sealing flange configured to be clamped between the body clamping flange and the bonnet clamping flange, said sealing flange being connected to a central dome having a convex side and a concave side, the concave side being oriented, in an unstressed position, toward the valve seat;
wherein cross sections of the inlet sleeve and the outlet sleeve each have a semi-elliptical shape at the respective openings into the fluid flow chamber, the semi-elliptical shape being defined by an arched portion on the outer side and a flattened portion on the inner side, the semi-elliptical shapes converging at the valve seat to provide the substantially elliptical curvature,
wherein the sealing flange of the diaphragm has an elongated shape inscribing the dome of the diaphragm,
wherein the sealing flange is joined to the dome along a substantially elliptical edge having a longer central axis and a shorter central axis, and
wherein the dome is substantially shaped like a sector of an ellipsoid so to cooperate with the valve seat, the dome comprising a plurality of ribs disposed in symmetrical position essentially parallel to a shorter axis of the dome,
wherein the valve body is made of plastic,
wherein the fluid flow chamber further comprises,
two pocket-like chambers closed at their external sides and open at their internal sides, the pocket-like chambers being disposed in adjacent positions, the internal sides of the pocket-like chambers being connected to a common opening of the fluid flow chamber, the common opening having an elongated shape in the flow direction and being surrounded by the body clamping flange of a cooperating elongated shape,
the two pocket-like chambers having each two opposed walls and further having upper edges of concave shape that face the opening and that slope in the direction of the central area of the fluid flow chamber from two opposing points substantially level with the edge of the opening, said upper edges of the two opposed walls being connected to each other by a surface forming the valve seat, and
wherein the two opposed walls of the two pocket-like chambers are divergent and connected together by a plurality of stiffening ribs that are oriented perpendicular to the body clamping flange and parallel to the flow direction.

28. A valve as claimed in claim 27, wherein at least some of the plurality of stiffening ribs connecting the opposed walls of the two pocket-like chambers extend for the entire length of the two opposed walls in a direction perpendicular to the body clamping flange.

29. A valve as claimed in claim 27, wherein at least some of the stiffening ribs connecting the two pocket-like chambers extend for the entire length of the two opposed walls of said pocket-like chambers to reach the outer surface of the valve body, thereby forming supporting feet.

30. A diaphragm open/close element for a diaphragm valve comprising:
a single level dome having a concave side and a convex side, the dome being shaped like a portion of an ellipsoid and having a longer central axis and a shorter central axis; and
a peripheral sealing flange having a substantially rectangular shape, the sealing flange being joined to the dome and surrounding the dome,
wherein the dome comprises,
at least one stiffening rib extending along the longer central axis and a plurality of ribs disposed in symmetrical positions essentially parallel to the shorter central axis, the stiffening rib and the plurality of ribs being disposed on the concave side of the dome, and
a centrally disposed circular stiffening member on the concave side of the dome,
wherein the plurality of ribs oriented parallel to the shorter central axis of the dome connect the longer central axis with the periphery of the dome, and
wherein all ribs and the central stiffening member are locally thickened wall portions of the dome,
wherein the dome has a constant thickness, and
wherein at least some of the ribs have a thickness that progressively increases in the direction of the center of the dome.

* * * * *